(12) United States Patent
Ueno et al.

(10) Patent No.: US 6,260,059 B1
(45) Date of Patent: Jul. 10, 2001

(54) KNOWLEDGE PROVIDER SYSTEM AND KNOWLEDGE PROVIDING METHOD UTILIZING PLURAL KNOWLEDGE PROVIDER AGENTS WHICH ARE LINKED BY COMMUNICATION NETWORK AND EXECUTE MESSAGE PROCESSING USING SUCCESSIVE PATTERN MATCHING OPERATIONS

(75) Inventors: Tsuyoshi Ueno, Tokyo; Yoshihiro Noguchi, Ichikawa; Hideki Yasukawa; Masaki Hoshida, both of Tokyo, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/241,054

(22) Filed: Feb. 1, 1999

(30) Foreign Application Priority Data

Apr. 16, 1998 (JP) .................................... 10-121641

(51) Int. Cl.⁷ .............................. G06F 15/16; G06F 17/30
(52) U.S. Cl. .......................... 709/202; 707/10; 707/100; 709/201; 709/203
(58) Field of Search .............................. 707/10, 6, 100; 709/202, 201, 203

(56) References Cited

U.S. PATENT DOCUMENTS

| 5,202,977 | * | 4/1993 | Pasetes, Jr. et al. ................. 703/27 |
| 6,085,224 | * | 7/2000 | Wagner .................................. 709/203 |
| 6,094,673 | * | 7/2000 | Dilip et al. ............................ 709/202 |
| 6,115,712 | * | 9/2000 | Islam et al. ............................ 707/10 |
| 6,134,580 | * | 10/2000 | Tahara et al. ........................ 709/202 |
| 6,144,989 | * | 11/2000 | Hodjat et al. ........................ 709/202 |

FOREIGN PATENT DOCUMENTS 6-4287    1/1994  (JP) .
10-21264  1/1998  (JP) .

* cited by examiner

*Primary Examiner*—Jean R. Homere
*Assistant Examiner*—Greta L. Robinson
(74) *Attorney, Agent, or Firm*—Connolly Bove Lodge & Hutz LLP

(57) ABSTRACT

A knowledge provider system is configured as a plurality of data servers connected via a data communication network, which function as respective knowledge provider agents in response to information request messages sent from users of the network. Each agent holds a script which contains a knowledge base, and data defining predetermined message formats for respective types of messages and predetermined content formats for respective types of message contents which can be handled by that agent. A message received by an agent is pattern-matched against the message formats, if it is thereby found to be an information request message the message content portion is pattern-matched against the predetermined content formats, and if that matching is successful, the subject for which information is requested is pattern-matched against the contents of the knowledge base, to find a set of information corresponding to that subject. If any of the pattern matching operations is not successful, the agent originates messages for successively propagating the content portion of that information request message to other agents via the network. Obtained information is then sent back to the originating agent and hence to the user.

17 Claims, 32 Drawing Sheets

FIG. 3

```
agentscript>
    id>agent1<id
    knowledge>
      next1([agent2])
      next2([agent3])
      info([videoA,[price,is,_,$25,_,_]])
    <knowledge
    rule>
      action([_,want,Object,info,_,_],[know:info([Object,[Info]])],Info)
    <rule
    message>
      input_message(text)
      text="ask(User,Me,Order)"->
            test(action(Order,_,Response)),
            tell(Me,User,Response),
      text="ask(Sender,Me,Order)"->
            test(action(Order,_,Response)),
            tell(Me,Sender,Response),
      text="tell(Sender,Me,Response)"->
            tell(Me,User,Response)
      text=?1->
            ask(Me,next1,Order)
            ask(Me,next2,Order)
      text=?2->
                  throw(next1,?2)
                  throw(next2,?2)
    <message
<agentscript
```

FIG. 4

```
agentscript>
    id>agent2<id
    knowledge>
      next1([agent4])
      next2([agent5])
      info([videoB,[price,is,_,$54,_,_]])
    <knowledge
    rule>
      action([_,want,Object,info,_,_],[know:info([Object,[Info]])],Info)
    <rule
    message>
      input_message(text)
      text="ask(User,Me,Order)"->
            test(action(Order,_,Response)),
            tell(Me,User,Response),
      text="ask(Sender,Me,Order)"->
            test(action(Order,_,Response)),
            tell(Me,Sender,Response),
      text="tell(Sender,Me,Response)"->
            tell(Me,User,Response)
      text=?1->
            ask(Me,next1,Order)
            ask(Me,next2,Order)
        text=?2->
                throw(next1,?2)
                throw(next2,?2)
    <message
<agentscript
```

FIG. 12

```
agentscript>
    id>agent1<id
    knowledge>
      next1([agent2])
      info([videoA,[price,is,_,$25,_,_]])
    <knowledge
    rule>

<rule
    message>
      input_message(text)
      text="ask(User,Me,Order)"->
              -     -     -     -
              tell(Me,Sender,Response)
      text="ask_rule(User,Me,Order)"->
      text="ask_knowledge(User,Me,Order)"->
      text="ask_rule_knowledge(User,Me,Order)"->
      text="ask_rule(Sender,Me,Order)"->
              test(action(Order,Action,Response)),
              tell_rule(Me,Sender,action(Order,Action,Response),
      text="ask_knowledge(Sender,Me,Order)"->
              test(action(Order,know:Knowledge,Response)),
              tell_knowledge(Me,Sender,Knowledge),
      text="ask_rule_knowledge(Sender,Me,Order)"->
              test(action(Order,Action,Response)),
              test(action(Order,know:Knowledge,Response)),
              tell_rule-knowledge(Me,Sender,
                  action(Order,Action,Response),Knowledge)
      text="tell_rule(Sender,Me,Action)"->
                  store(Action)
      text="tell_knowledge(Sender,Me, Knowledge)"->
                  store(Knowledge)
      text="tell_rule_knowledge(Sender,Me,Action,Knowledge)"
                  store(Action)
                  store(Knowledge)
      text=?1->
              ask(Me,next1,Order)
      text=?2->
              ask_rule(Me,next1,Order)
      text=?3->
              ask_knowledge(Me,next1,Order)
      text=?4->
              ask_rule_knowledge(Me,next1,Order)
      text=?5->
              throw(next1,?5)
    <message
<agentscript
```

FIG. 18

```
agentscript>
    id>agent1<id
    knowledge>
      next1([agent2])
      info([videoA,[price,is,_,$25,_,_]])
    <knowledge
    rule>

<rule
    message>
      input_message(text)
      text="ask(User,Me,Order)"->
            -    -    -    -
            tell(Me,Sender,Response)
      text="ask_rule(Sender,Me,Order)"->
            test(action(Order,Action,Response)),
            tell_rule(Me,Sender,action(Order,Action,Response),
      text="ask_knowledge(Sender,Me,Order)"->
            test(action(Order,know:Knowledge,Response)),
            tell_knowledge(Me,Sender,Knowledge),
      text="ask_rule_knowledge(Sender,Me,Order)"->
            test(action(Order,Action,Response)),
            test(action(Order,know:Knowledge,Response)),
            tell_rule-knowledge(Me,Sender,
                    action(Order,Action,Response),Knowledge)
      text="tell_rule(Sender,Me,Action)"->
                    store(Action)
      text="tell_knowledge(Sender,Me, Knowledge)"->
                    store(Knowledge)
      text="tell_rule_knowledge(Sender,Me,Action,Knowledge)"
                    store(Action)
                         store(Knowledge)
      text=?1->
            ask(Me,next1,Order)
      text=?2->
            ask_rule(Me,next1,Order)
      text=?3->
            ask_knowledge(Me,next1,Order)
      text=?4->
            ask_rule_knowledge(Me,next1,Order)
      text=?5->
                    throw(next1,?5)
    <message
<agentscript
```

FIG. 21

```
agentscript>
    id>agent1<id
    knowledge>
      next1([agent2])
      next2([agent3])
      info([videoA,[price,is,_,$25,_,_]])
    <knowledge
    rule>
      action([_,want,Object,info,_,_],[know:info([Object,[Info]])],Info)
      action([_,decrease,_,Count,_,_],[decrease(Count,NewCount)],NewCount)
    <rule
    message>
      input_message(text)
      text="ask(User,Me,Order)"->
            -   -   -   -
            tell(Me,Sender,Response)
      text="ask_all(User,Me,Count,Order)"->
            test(
                action(Order,_,Response)
                action([_,decrease,_,Count,_,_],_,NewCount)
            ),
            ask_all(Me,next1,NewCount,Order):[AppResponse]
      text="ask_all(Sender,Me,Count,Order):[AppResponse]"->
            test(
                action(Order,_,Response)),
                action([_,decrease,_,Count,_,_],_,NewCount)
            )
            check_count(NewCount,
                throw_append(next1,
                    ask_all(Sender,Me,NewCount,Order):[AppResponse]),
                tell_append(Me,Sender,AppResponse)
            )
      text="tell_append(Sender,Me,AppResponse)"->
            tell_append(Me,User,AppResponse)
      text="tell(Sender,Me,Response)"->
            tell(Me,User,Response)
      text=?1->
            ask(Me,next1,Order)
            ask(Me,next2,Order)
      text=?2->
            throw(next1,?2)
            throw(next2,?2)
    <message
<agentscript
```

FIG. 22

```
agentscript>
    id>agent2<id
    knowledge>
      next1([agent4])
      next2([agent5])
      info([videoA,[price,is,_,$54,_,_]])
    <knowledge
    rule>
       action([_,want,Object,info,_,_],[know:info([Object,[Info]])],Info)
       action([_,decrease,_,Count,_,_],[decrease(Count,NewCount)],NewCount)
    <rule
    message>
      input_message(text)
      text="ask(User,Me,Order)"->
            -    -    -    -
            tell(Me,Sender,Response)
      text="ask_all(User,Me,Count,Order)"->
            test(
                action(Order,_,Response)
                action([_,decrease,_,Count,_,_],_,NewCount)
            ),
            ask_all(Me,next1,NewCount,Order):[AppResponse]
      text="ask_all(Sender,Me,Count,Order):[AppResponse]"->
            test(
                action(Order,_,Response)),
                action([_,decrease,_,Count,_,_],_,NewCount)
            )
            check_count(NewCount,
                throw_append(next1,
                    ask_all(Sender,Me,NewCount,Order):[AppResponse]),
                tell_append(Me,Sender,AppResponse)
            )
       text="tell_append(Sender,Me,AppResponse)"->
            tell_append(Me,User,AppResponse)
       text="tell(Sender,Me,Response)"->
            tell(Me,User,Response)
       text=?1->
            ask(Me,next1,Order)
            ask(Me,next2,Order)
       text=?2->
                throw(next1,?2)
                throw(next2,?2)
    <message
<agentscript
```

FIG. 27

```
agentscript>
    id>agent1<id
    knowledge>
      next1([agent2])
      next2([agent3])
      info([videoA,[price,is,_,$25,_,_]])
    <knowledge
    rule>
       action([_,teach,Object,info,_,_],[know:info([Object,[Info]])],Info)
    <rule
    message>
      input_message(text)
      text="ask(User,Me,Order)"->
            test(action(Order,_,Response)),
            tell(Me,User,Response),
      text="ask(Sender,Me,Order)"->
            test(action(Order,_,Response)),
            tell(Me,Sender,Response),
      text="tell(Sender,Me,Response)"->
            tell(Me,User,Response)
      text=?1->
            ask(Me,next1,Order)
            ask(Me,next2,Order)
      text=?2->
            test(expand(?2))
            throw(next1,?2)
            throw(next2,?2)
    <message
    expansion>
            [_,V,_,_,_,_]:          V=want | teach |send
            [_,_,_,O,_,_]:          O=info | information |report
            [_,_,_,_,O,_]:          O=info | information |report
    <expansion
<agentscript
```

FIG. 30

```
agentscript>
   load>
           [_,_, news ,_,_,_] :           <-news.agentscript 60sec
                                          ->*.agentscript
           [_,_, sports ,_,_,_] :         <-sports.agentscript
           [_,_, weather ,_,_,_] :        <-weather.agentscript
           [_,_, music ,_,_,_] :          <-music.agentscript
           [_,_,_,_, where ,_] :          <-place.agentscript
   <load
   load_relation>
           [_,_, news ,_,_,_]             >>[_,_,_, sports ,_,_]
                                          >>[_,_,_, weather ,_,_]
           [_,_, weather ,_,_,_]          >>[_,_,_,_, where ,_]
   <load_relation
<agentscript
```

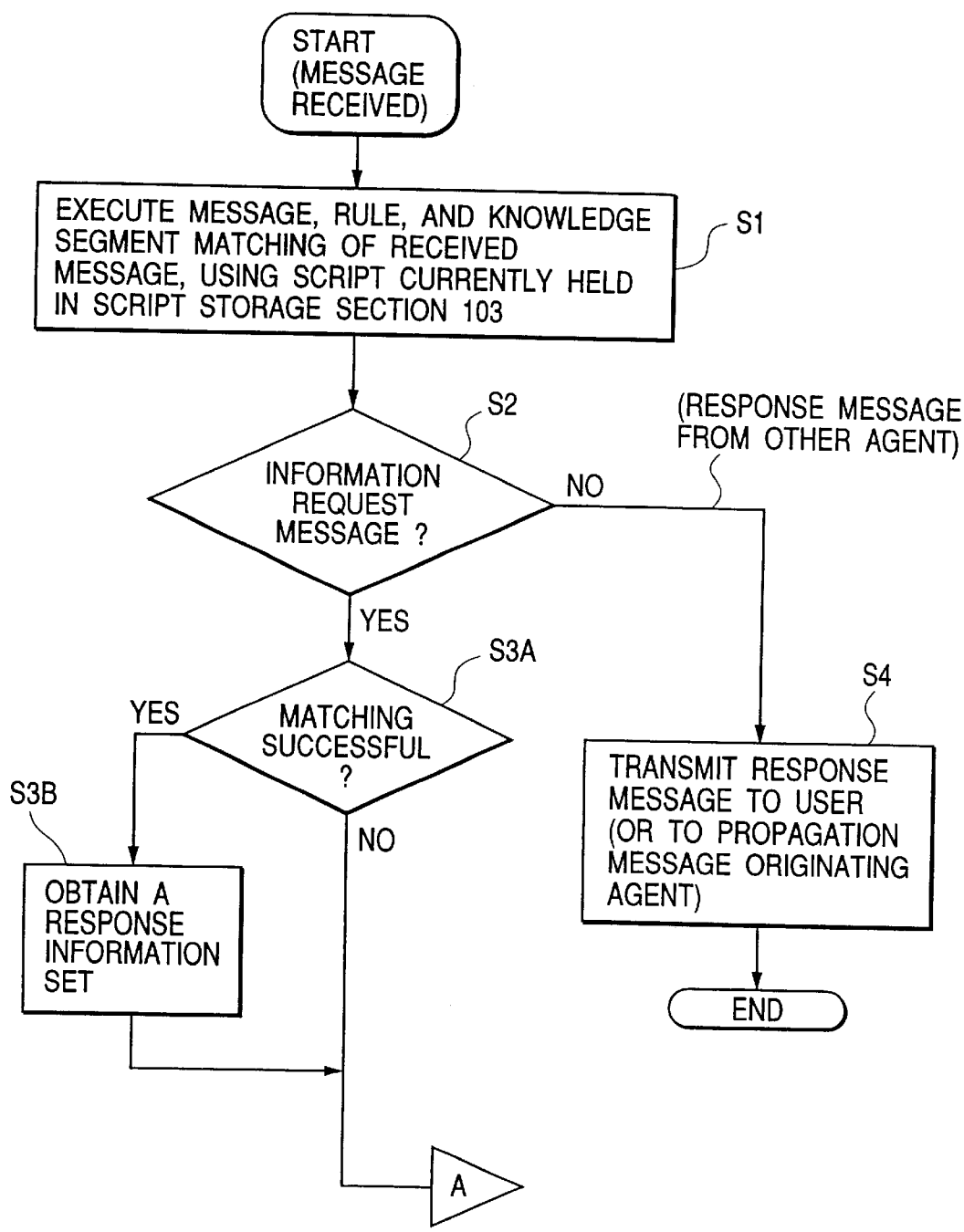

KNOWLEDGE PROVIDER SYSTEM AND KNOWLEDGE PROVIDING METHOD UTILIZING PLURAL KNOWLEDGE PROVIDER AGENTS WHICH ARE LINKED BY COMMUNICATION NETWORK AND EXECUTE MESSAGE PROCESSING USING SUCCESSIVE PATTERN MATCHING OPERATIONS

BACKGROUND OF THE INVENTION

1. Field of the Invention

The present invention relates to a knowledge provider system having a stored database (i.e., knowledge base), which can be accessed to obtain information relating to specific subjects by sending information request messages in accordance with a set of predetermined rules, sometimes referred to as a rule base, and to a corresponding knowledge providing method.

In particular, the invention relates to a knowledge provider system in which the knowledge base is distributed throughout a plurality of separate knowledge provider data processing apparatuses which mutually communicate with one another and with users of the system via a data communication network.

2. Description of Prior Art

In the prior art, there have been various proposals for overcoming the disadvantages of a basic type of knowledge provider system in which a single knowledge provider apparatus (i.e., server) stores a knowledge base whose contents can be accessed by sending to the knowledge provider apparatus information request messages which are in accordance with rules that have been predetermined for that knowledge provider apparatus. With one technique, as described in Japanese patent HEI 10-21264, such a single knowledge provider agent (server) is connected via a data communication network to one or more data processing installations each of which store a knowledge base, with that server being able to obtain requisite information from these other installations, when required for the purpose of responding to information request messages from users. However with such a system, utilizing centralized control based on a single server, the disadvantage remains that any failure of the knowledge server will result in complete breakdown of the system as a whole.

With another prior art proposal which is described in Japanese patent HEI 6-4287, a plurality of knowledge bases, with respective rule bases, are held stored at a knowledge provider apparatus. When a message requesting information is received from a user, then the contents of that message are evaluated by the knowledge provider apparatus, and an appropriate one of the plural knowledge bases is read out from storage, to be searched to obtain the required information. In that way, it becomes possible to achieve increased efficiency and speed of operation, by selecting the knowledge base that is to be searched based upon such factors as the category of the information which is to be searched for, degree of complexity of search conditions which may be specified, etc. However such a knowledge provider system again has the basic disadvantage of centralized control of the overall system, as described above.

A further disadvantage of such prior art types of knowledge provider system is that it is necessary that any message requesting information, sent by a user, must in general be exactly in accordance with the predetermined rules for that particular knowledge provider system, e.g., must use a specific syntax for the message contents. Thus, even if two or more of such knowledge provider systems (for example configured as "expert systems") are connected to a data communication network, such that they can be freely accessed by users of the network, it is inconvenient for the users to access these knowledge provider systems by generating information request messages which must be strictly in accordance with respectively different sets of rules.

Furthermore, the operation and configuration of such a prior art type of knowledge provider system based on centralized control becomes substantially more complex if system security is important, i.e., if it is necessary that access to certain parts of the knowledge base be restricted in some manner, rather than being freely available to the public.

There is therefore a requirement for a knowledge provider system which overcomes the disadvantages of the prior art by enabling:

(a) decentralized control, so-that the failure of a single data processing installation will not result in breakdown of the overall system, (b) greater flexibility of use, by permitting some degree of variation in the rules concerning request messages which are submitted to the system from users, and (c) ease of implementing system access security measures.

SUMMARY OF THE INVENTION

It is an objective of the present invention to overcome the disadvantages of the prior art set out above, by providing a knowledge provider system in which respective knowledge bases, which are stored at each of various knowledge provider apparatuses (basically consisting of respective data servers, and referred to in the following as knowledge provider agents) that are mutually connected via a data communication network, can be utilized collectively as a single knowledge base which can be freely accessed by the data processing apparatuses of users (referred to in the following as user apparatuses), without the need for any form of centralized control of the system, so that the failure of any one of the knowledge provider agents will result in only loss of the contents of the knowledge base which is stored at that agent, but will otherwise have no effect upon the overall system operation.

It is a further objective to provide such a knowledge provider system, having the advantage that messages submitted by users for requesting information may be configured in various different ways rather than having to be in accordance with one specific rule base.

It is a further objective to provide such a knowledge provider system, having the advantage that knowledge base and/or rule base information relating to any particular subject, stored at a knowledge provider agent, can readily be acquired and stored by any other agent of the system.

It is a further objective to provide such a knowledge provider system, having the advantage that respective sets of information relating to a specific subject, which are stored at various different ones of the knowledge provider agents, can be automatically collected from these knowledge provider agents and supplied to a requesting user, in response to a message sent from the user to any of the knowledge provider agents.

It is a further objective to provide such a knowledge provider system, having the advantage that an appropriate one of a plurality of knowledge bases stored at an agent can be selected to be accessed in response to an information request message from a user, with the selection being based upon the contents of that message.

In the following, a combination of a specific knowledge base and rule information, which defines how that knowledge base is to be accessed, will be referred to as a script. As will be made clear from the following descriptions, with the present invention, such a script further includes information for enabling discrimination between different types of message that are received by a knowledge provider agent.

More specifically, the present invention provides an agent knowledge provider system comprising a plurality of knowledge provider agents and plurality of user apparatuses respectively interconnected for exchange of messages via a data communication network, with each of said messages including at least a sender identifier, a destination identifier, and a content portion, each of said knowledge provider agents comprising:

script storage means having stored therein a script containing message processing information and respective identifiers of a plurality of knowledge provider agents which have been assigned as respective propagation destination agents of said agent, said message processing information comprising a Message segment, a Rule segment and a Knowledge segment, said Message segment containing a plurality of message format descriptors respectively corresponding to a format of a user request message that is received from a user apparatus, to a format of a propagation message that is received from another one of said agents, and to a format of a response message which is received from another one of said agents, said Rule segment containing at least one content format descriptor, and said Knowledge segment containing at least one knowledge combination formed of a query item and a response information set corresponding to said query item, and script execution and message handling means for obtaining said script from said script storage means when a message is received via said network by said agent, and executing a first pattern matching of said received message with the contents of said Message segment, when said received message is found to match one of said user request message format descriptor and propagation message format descriptor, executing a second pattern matching of comparing said content portion of said message with the contents of said Rule segment, and when said received message content portion is found to match said content format descriptor, extracting at least one character string from a section of said message content portion that is indicated by said Rule segment contents, and executing a third pattern matching of said extracted character string against said query item, and when matching success is achieved for each of said first, second and third matching operations, generating a response message having said response information set as the content portion thereof and having the sender identifier of said received request message as the destination identifier thereof, and transmitting said response message via said network, when said received message is found to match said user request message format descriptor and at least one of said matching operations is not successful, registering the identifier of the user apparatus that is the sender of said message, originating a plurality of propagation messages having said identifiers of said propagation destination agents as respective destination identifiers thereof, with each propagation message having said received message content portion as the content portion thereof, and transmitting said propagation messages via said network, when said received message is found to match said propagation message format descriptor and at least one of said matching operations is not successful, redirecting said propagation message to each of said propagation destination agents, with said sender identifier of the received message left unchanged, and transmitting the resultant propagation messages via said network, and when said received message is found to match said response message format descriptor, obtaining a previously registered identifier of a user apparatus, generating a response message having the content portion of said received message as the content portion thereof and said user apparatus identifier as the destination identifier thereof, and transmitting said response message via said network.

The invention further provides such an agent knowledge provider system, further characterized in that at least one of said user apparatuses is operable for sending to a knowledge provider agent a processing information acquisition request message for commanding said knowledge provider agent to acquire processing information relating to a specific message content portion from the script of another one of said knowledge provider agents, wherein each knowledge provider agent further comprises script combining means coupled to said script storage means, wherein said Message segment further includes a format descriptor for a processing information acquisition request message, a format descriptor for a processing information acquisition message, and a format descriptor for a processing information response message, and wherein said script execution and message handling means further comprises means for, when a received message is found to match said processing information acquisition request message format descriptor, generating a plurality of processing information acquisition messages having respective identifiers of said propagation destination agents as the destination identifiers thereof, each having the content portion of said received message as the content portion thereof, and transmitting said messages via said network, when a received message is found to match said processing information acquisition message format descriptor, executing at least one of said second and third matching operations, as predetermined for said processing information acquisition message format descriptor, and when each of said matching operations have been successful, extracting from said script a part of said processing information, as predetermined for said processing information acquisition message format descriptor, generating a processing information response message having said extracted processing information as the content portion thereof and having the sender identifier of said received message as the destination identifier thereof, and transmitting said response message via said network, when a received message is found to match said processing information response message format descriptor, extracting said content portion of said received message and supplying said content portion to said script combining means, to be combined with said processing information of said script.

The processing information to be acquired in that way may be designated as being a content format descriptor that is appropriate for the specified message content portion, to be inserted into the Rule segment of the script of the acquiring agent, or the knowledge combination corresponding to the specified message content portion, which is to be inserted into the Knowledge segment of that script, or both the content format descriptor and knowledge combination which are appropriate for the specified message content portion.

Alternatively, each of the knowledge provider agents (or a predetermined set of the knowledge provider agents of the system) can be configured such as to automatically initiate operations for acquiring such processing information relating to the content portion of a received information request message from a user, if the agent is itself unable to provide the requested information and must therefore generate propagation messages which are sent to other agents. More specifically, from that aspect, the invention provides an agent knowledge provider system wherein each of said knowledge provider agents further comprises processing information acquisition message generating means responsive to origination of a propagation message by said knowledge provider agent for generating a plurality of processing information acquisition messages having as respective destination identifiers said identifiers of said propagation destination agents, each of said processing information acquisition messages having the content portion of said propagation message as the content portion thereof, each of said agents further comprising script combining means coupled to said script storage means, wherein said Message segment further includes a format descriptor for a processing information acquisition message, and a format descriptor for a processing information response message, and wherein said script execution and message handling means further comprises means for, when a received message is found to match said processing information acquisition message format descriptor, executing at least one of said second and third matching operations, as predetermined for said processing information acquisition message format descriptor, and when each of said matching operations have been successful, extracting a part of said processing information, as predetermined for said processing information acquisition message format descriptor, generating a processing information response message having said extracted processing information as the content portion thereof and having the sender identifier of said received message as the destination identifier thereof, and transmitting said response message via said network, and, when a received message is found to match said processing information response message format descriptor, extracting said specific processing information from said received message and supplying said specific processing information to said script combining means, to be combined with said processing information of said script.

In that case too, the system can be configured such that the processing information to be acquired is specified as being a content format descriptor, to be inserted into the Rule segment of the script stored at the acquiring agent, a knowledge combination to be inserted into the Knowledge segment of that script, or both content format descriptor and knowledge combination.

As stated hereinabove, the invention also enables a knowledge provider system to be implemented whereby flexibility of use is achieved, by enabling the system to recognize various different request message formats rather than being strictly limited to recognizing only one specific format. This is achieved by providing each agent with respective stored sets of aliases which have been predetermined for use with a plurality of data fields of a received information request message. If it is found that the format of a received request message does not match a Rule (i.e., test) format utilizing one combination of these aliases, then a different alias is read out for one of the data fields, to form a different Rule format, and matching against the received message is repeated, and so on in succession until all of the aliases have been utilized or a successful match between the received message format and a Rule format has been achieved. Each alias may consist of one or more character strings. More specifically, from that aspect the invention provides an agent knowledge provider system wherein the aforesaid message content portion is configured with a plurality of data fields, wherein said content format descriptor of said Rule segment defines respective character strings as occupying specific ones of said data fields, wherein each said character string defined for a data field is one of a set of alias character strings which have been predetermined as corresponding to said data field, wherein said each knowledge provider agent further comprises message content expansion means for storing said sets of alias character strings, and wherein said script execution and message handling means further comprises means for repetitively executing operations of, when said second matching operation is not successful, reading out one of said alias character strings for one of said data fields, from said message content expansion means, replacing a character string which is currently defined for said field in said content format descriptor by said alias character string which is read out, and re-executing said second matching operation.

In addition, according to another aspect, the invention provides a knowledge provider system whereby a knowledge provider agent can select one of a plurality of possible scripts to be utilized for obtaining response information for a received information request message, with the selection being determined in accordance with the contents of the received message. More specifically, the selection is executed in accordance with a specific subject for which an information search is specified in the information request message, i.e., the query item contained in that message.

More specifically, according to that aspect the invention provides an agent knowledge provider system wherein said each knowledge provider agent further comprises script group storage means for storing a plurality of respectively different scripts each having a Knowledge segment, Rule segment, Message segment and identifiers of assigned propagation destination agents, replacement control script storage means for storing a replacement control script having a script selection segment formed of a plurality of content format descriptors each predetermined as corresponding to one of said plurality of scripts held in said script group storage means and having a related script segment formed of at least one content format descriptor, with each of said content format descriptors of the related script segment being linked to at least one of said content format descriptors of the script selection segment, and script storage section control means coupled to each of said script storage means, script group storage means and replacement control script storage means, functioning in conjunction with said script execution and message handling means to control transfer of scripts between said script group storage means and script storage means, said script storage section control means in conjunction with said script execution means comprising means for when a received message has been found to match one of said user request message format descriptor and propagation message format descriptor and said second and third matching operations have been executed, temporarily registering any response information set which is obtained as a result of said matching operations, and executing a script selection operating sequence of matching said content portion of said received message against the contents of said script selection segment of said replacement control script, when said content portion is found to match one of said content format descriptors of said script selection segment, deleting the script which is currently held in said script storage means, reading out from said script group storage means the one of said scripts which corresponds to said matching content format descriptor of the script selection segment, and loading said script into said script storage means, and executing said second and third matching operations of said message content portion against said script which has been loaded into said script storage means, and temporarily registering any response information set which is obtained as a result of said matching operations, and matching said content portion of said received message;

matching said message content portion against the contents of said related script segment of said replacement control script, when said content portion is found to match one of said content format descriptors of said related script segment, identifying a format descriptor of said script selection segment which is lined to said matching format descriptor of the related script segment, identifying a script corresponding to said identified format descriptor, loading said identified script into said script storage means, executing said second and third matching operations of said message content content portion against said script which has been loaded into said script storage means, and temporarily registering any response information set which is obtained thereby, and generating a response message having the sender identifier of said received message as the destination identifier thereof and having all of said obtained response information sets as the content portion thereof, and transmitting said response message via said network.

The invention moreover provides a method of knowledge providing, for application to a system comprising a plurality of knowledge provider agents and plurality of user apparatuses respectively interconnected for exchange of messages via a data communication network, with each of said messages including at least a sender identifier, a destination identifier, and a content portion, the method comprising, for each of said knowledge provider agents:

storing beforehand at said agent a script containing message processing information and respective identifiers of a plurality of knowledge provider agents which have been assigned as respective propagation destination agents of said agent, said message processing information comprising a Message segment, a Rule segment and a Knowledge segment, said Message containing a plurality of message format descriptors respectively corresponding to a format of a user request message that is received from a user apparatus, to a format of a propagation message that is received from another one of said agents, and to a format of a response message which is received from another one of said agents, said Rule segment containing at least one content format descriptor, and said Knowledge segment containing at least one knowledge combination formed of a query item and an information set which is linked to said query item, and controlling said each agent for obtaining said stored script when a message is received via said network by said agent, and executing a first matching operation of comparing said received message with the contents of said Message segment, when said received message is found to match one of said user request message format descriptor and propagation message format descriptor, executing a second matching operation of comparing said content portion of said message with the contents of said Rule segment, and when said received message content portion is found to match said content format descriptor, extracting at least one character string from a section of said message content portion that is indicated by said Rule segment contents and executing a third matching operation of comparing said extracted character string with said query item, and when matching success is achieved for each of said first, second and third matching operations, generating a response message having said response information set as the content portion thereof and having the sender identifier of said received request message as the destination identifier thereof, and transmitting said response message via said network, when said received message is found to match said user request message format descriptor and at least one of said matching operations is not successful, registering the identifier of the user apparatus that is the sender of said message, originating a plurality of propagation messages having said identifiers of said propagation destination agents as respective destination identifiers thereof, with each propagation message having said received message content portion as the content portion thereof and having the identifier of said each knowledge provider agent as the sender identifier thereof, and transmitting said propagation messages via said network, when said received message is found to match said propagation message format descriptor and at least one of said matching operations is not successful, redirecting said propagation message to each of said propagation destination agents, with said sender identifier of the received message left unchanged, and transmitting the resultant propagation messages via said network, and when said received message is found to match said response message format descriptor, obtaining a previously registered identifier of a user apparatus, generating a response message having the content portion of said received message as the content portion thereof and said user apparatus identifier as the destination identifier thereof, and transmitting said response message via said network.

BRIEF DESCRIPTION OF THE DRAWINGS

FIGS. 3 and 4 are examples of scripts which are respectively stored at two agents of the first embodiment, FIG. 12 is an example of a script which is stored at a knowledge provider agent of the second embodiment, FIG. 18 is an example of a script which is stored at a knowledge provider agent of the third embodiment, FIGS. 21, 22 are respective examples of script stored at two knowledge provider agents of the fourth embodiment, FIG. 27 is an example of a script which is stored at a knowledge provider agent of the sixth embodiment, FIG. 30 is an example of a replacement control script which is stored at a knowledge provider agent of the seventh embodiment, for use in script selection in accordance with the contents of a received message, and FIGS. 31A, 31B constitute a flow diagram of the the overall operation of an agent of the seventh embodiment.

DESCRIPTION OF PREFERRED EMBODIMENTS

Figure 1A:
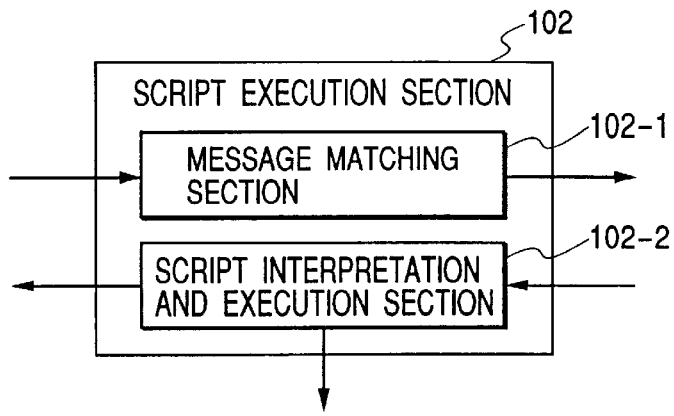
FIG. 1A is a block diagram showing the basic internal configuration of a script execution section in a knowledge provider agent of a first embodiment of a knowledge provider system according to the present invention.

A first embodiment of a knowledge provider system according to the present invention will be described, referring first to the general system block diagrams of FIGS. 1A, 1B. Such a system is based upon a plurality of data server installations which are configured and function in a specific manner as described hereinafter, and which are referred to herein as knowledge provider agents (generally abbreviated in the following to "agents") which are mutually connected for exchange of messages via a data communication network, and which can also exchange messages with user apparatuses which are connected to the network. To enable such exchange of messages, each of the agents and user apparatuses of the knowledge provider system has a preassigned identifier, i.e. a network ID, which for example may be linked to a unique address within the network (or within one specific domain of the network) by a "name server" installation, as in the case of a usual type of network message interchange system such as e-mail.

As described in the following, it is necessary that each agent be able to distinguish between messages sent by users and messages sent from other agents of the knowledge provider system, however it will be apparent that this can easily be arranged in various ways, so that detailed description will be omitted.

In the following, the functions performed by an agent will be basically categorized as "sections" of the agent, for ease of description, although it will be understood that in a practical apparatus various ones of these functions will be implemented by execution of an appropriate control program. Each agent contains a script execution section 102, a message input section 101 serving as an input interface between the network and the agent, a message output section 105 which functions as an output interface with the network, a script storage section 103 and a propagation message generating section 104. The script execution section 102 has the basic functions shown in FIG. 1A, and each agent is internally configured as for the agent 100 shown in FIG. 1B. The script execution section 102 has a message matching section 102-1 which is capable of registering a received message (passed from the message input section 101) until processing of the message has been completed, and which compares first the entire message, then specific parts of the message, with predetermined parts of data which are held in the script storage section 103 and are arranged in the form of a script, as described in the following. When satisfactory matching is achieved, predetermined operations are then executed by a script interpretation and execution section 102-2 of the script execution section 102, to generate a response message conveying a specific part of the script data (i.e., knowledge information), with the message then being passed to the message output section 105, to be sent via the network to the apparatus of the requesting user or to another agent which will pass the message to that user, as described hereinafter.

Figure 1B:
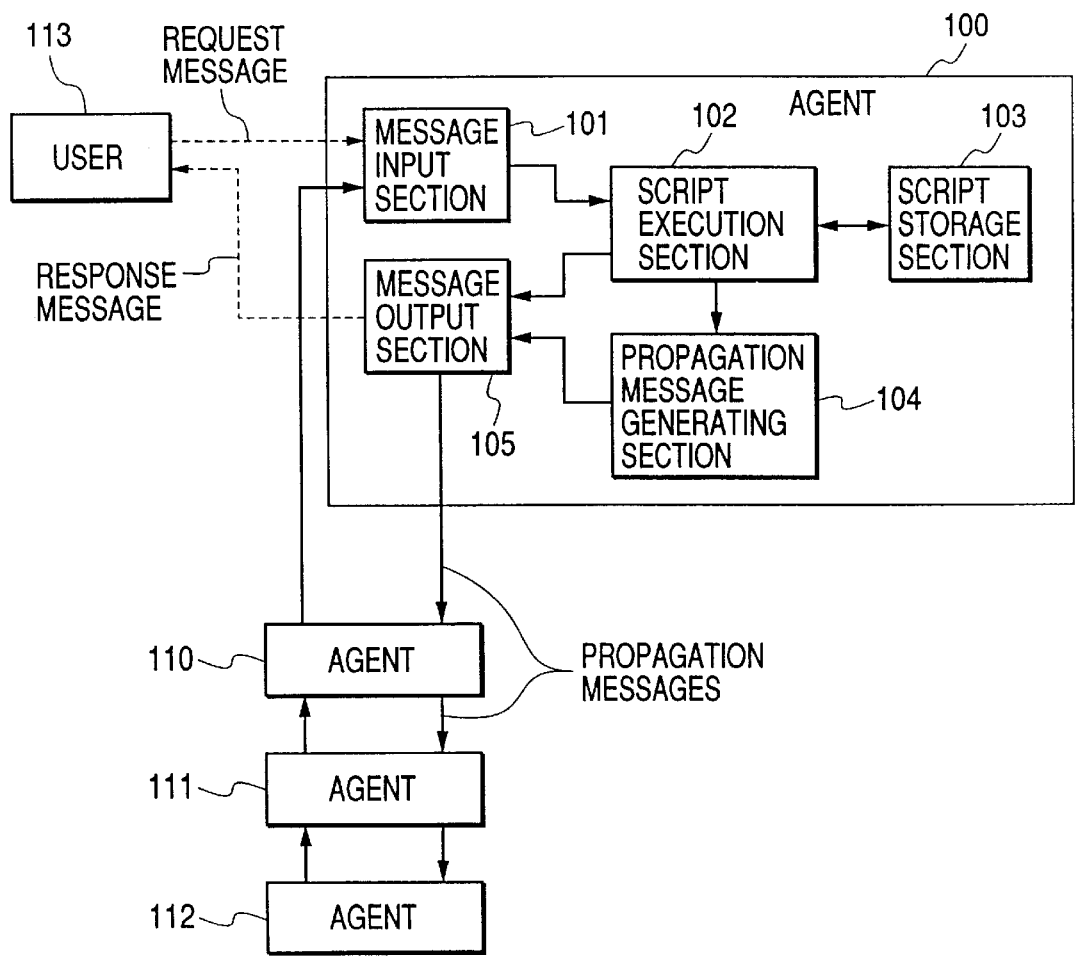
FIG. 1B is a general system block diagram of the first embodiment.

Although the message input section 101, message output section 105, script execution section 102 and propagation message generating section 104 are shown as respectively separate sections in FIG. 1B, these can be considered to constitute, in combination, the message handling and script execution part of an agent, which receives input messages and produces appropriate output messages in response.

If as a result of the matching processing it is found that the required knowledge information is not available, then the contents of the received message are supplied to the propagation message generating section 104, which originates a propagation message, i.e. a message containing the received message contents but is addressed to each of a predetermined plurality of other ones of the agents, and whose sender identifier is fixedly determined as the identifier of the originating agent. Such predetermined other ones of the agents will be referred to in the following as the propagation destination agents. In FIG. 1B for example, it is assumed that the agent 111 has the agents 110, 112 as its propagation destination agents, while agent 110 has the agents 100, 111 as its propagation destination agents.

Figure 2:
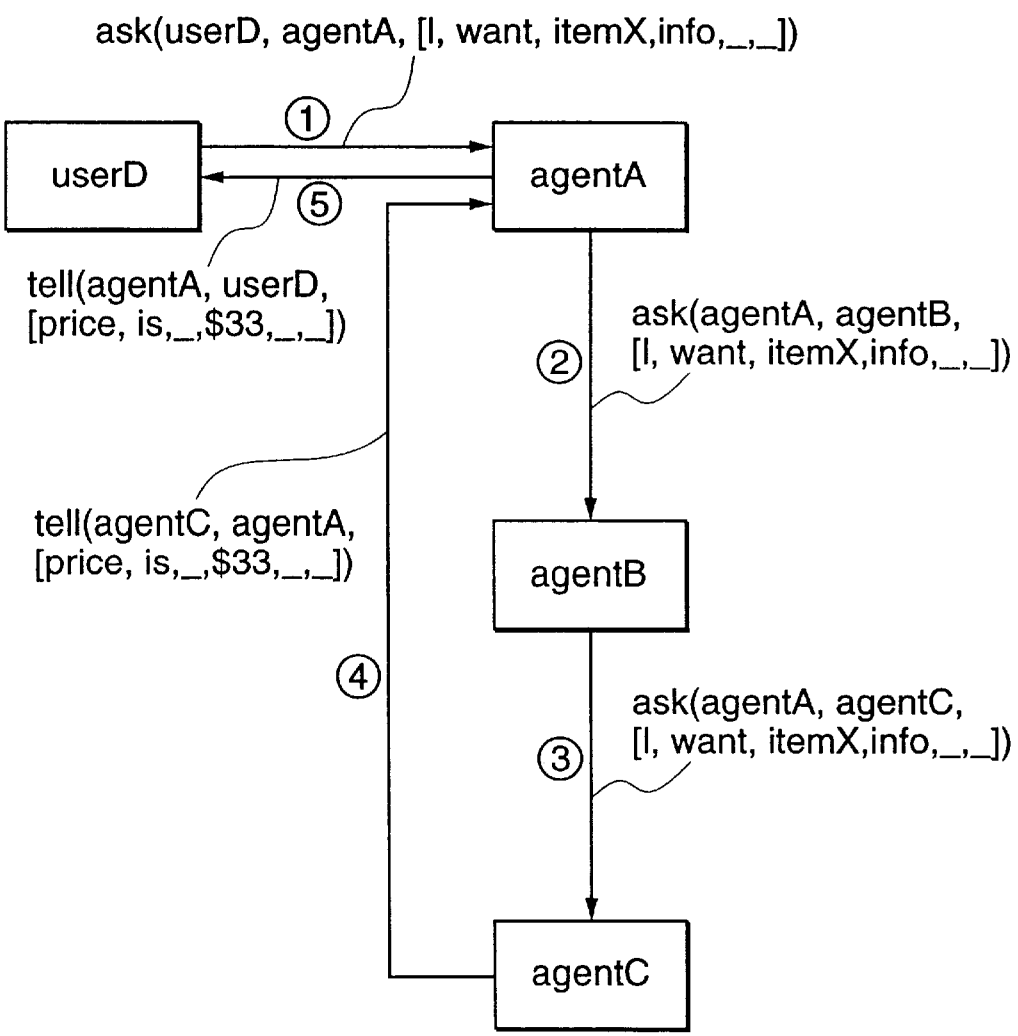
FIG. 2 is a diagram showing an example of a sequence of message exchanges involved in acquisition of information by a user apparatus, with the first embodiment.

The basic operation of this embodiment is illustrated in the simple example of FIG. 2, in which a user having the identifier "userD" sends a message requesting information concerning a specific item (such an item being referred to in the following as a query item) named "itemX". Three agents are shown, having the respective identifiers agentA, agentB and agentC, and with agentA having agentB as a propagation destination agent, while agentB has agentC as a propagation destination agent. In the following description, the convention will generally be followed that a word beginning with an upper-case letter, appearing in a field of a message content portion, represents a variable, i.e.,is the name of the contents of that field or of the contents which are to be inserted into that field, whereas a word beginning with a lower-case letter signifies an alphanumeric character string which is actually inserted into that field and is used in the pattern matching operations described in the following, and a blank field (indicated by an underline) can contain any arbitrary contents (i.e., any contents do not affect the results of the described pattern matching operations). In the described examples, each field contains only a single character string, however this is not essential. It will further be assumed that a request message generated by a user, in this example, must be in the format:

ask(User,Agent,[I,want,Object,info,_,_])

where the message is prefixed by a string "ask", signifying that this is an information request message, "User" is the identifier of the requesting user, "Agent" is the identifier of the destination, i.e., the agent to which the message is directed, "Object" is the query item, and the portion "[I, want , . . . ]" constitutes the actual message contents, referred to in the following as the content portion, and having a predetermined number of data fields. In this case therefore, userD generates the information request message:

ask(userD,agentA,[I,want,itemX,info,_,_]).

It will be assumed that only agentC has the required information. In that case, when the request message is received by agentA and it is found that the requisite information is not available (i.e., the request message contents do not completely match the contents of the script which is held by agentA), agentA then generates a plurality of propagation messages, in the format:

ask(Sender,newN,[I,want,Object,info,_,_])

where "Sender" signifies the identifier of the agent which originates the propagation message (in this case, agentA), and "newN" signifies the identifier of a propagation destination agent which is assigned to that agent. In this case therefore, agentA generates the propagation message:

ask(agentA,agentB,[I,want,itemX,info,_,_]).

When this propagation message is received by agentB, is it again found that the required information is not available, whereupon agentB redirects the propagation message to each of its propagation destination agents, one of which is agentC. That is to say, agentB generates a propagation message containing the received message contents and addressed to agentC, but with the name of the sender left unchanged as agentA, i.e.:

ask(agentA,agentC,[I,want,itemX,info,_,_]).

If agentC achieves successful matching of the message contents with its script and thereby obtains the necessary response information set, it generates a response message that is addressed to the agent which originated the received propagation message, in the format:

tell(Sender,Agent,Response)

where the message is prefixed by "tell" to signify that this is an information response message, "Sender" signifies the identifier of the responding agent, "Agent" is the identifier of the originating agent, i.e.,which originated the propagation message, and s"Response" signifies the response information set which is to be sent to the user. In this case therefore, agentC generates the response message:

tell(agentC,agentA,[price,is,_,$33,_,_]).

When this message is received by agentA, that agent generates a response message addressed to the requesting user, containing the information ("price is $33") that has been requested. It will be assumed that the same "tell" message format is used for this, i.e. agentA sends the message:

tell(userD,agentA,[price,is,_,$33,_,_]).

In this and subsequent examples it is assumed for simplicity of description that each response information set is in the above form of a data record, formatted with a specific number of fields. However it will be understood that the invention is not limited to such an arrangement, and that a response information set could consist of information in other forms, such as plain text, etc.

Figure 6:
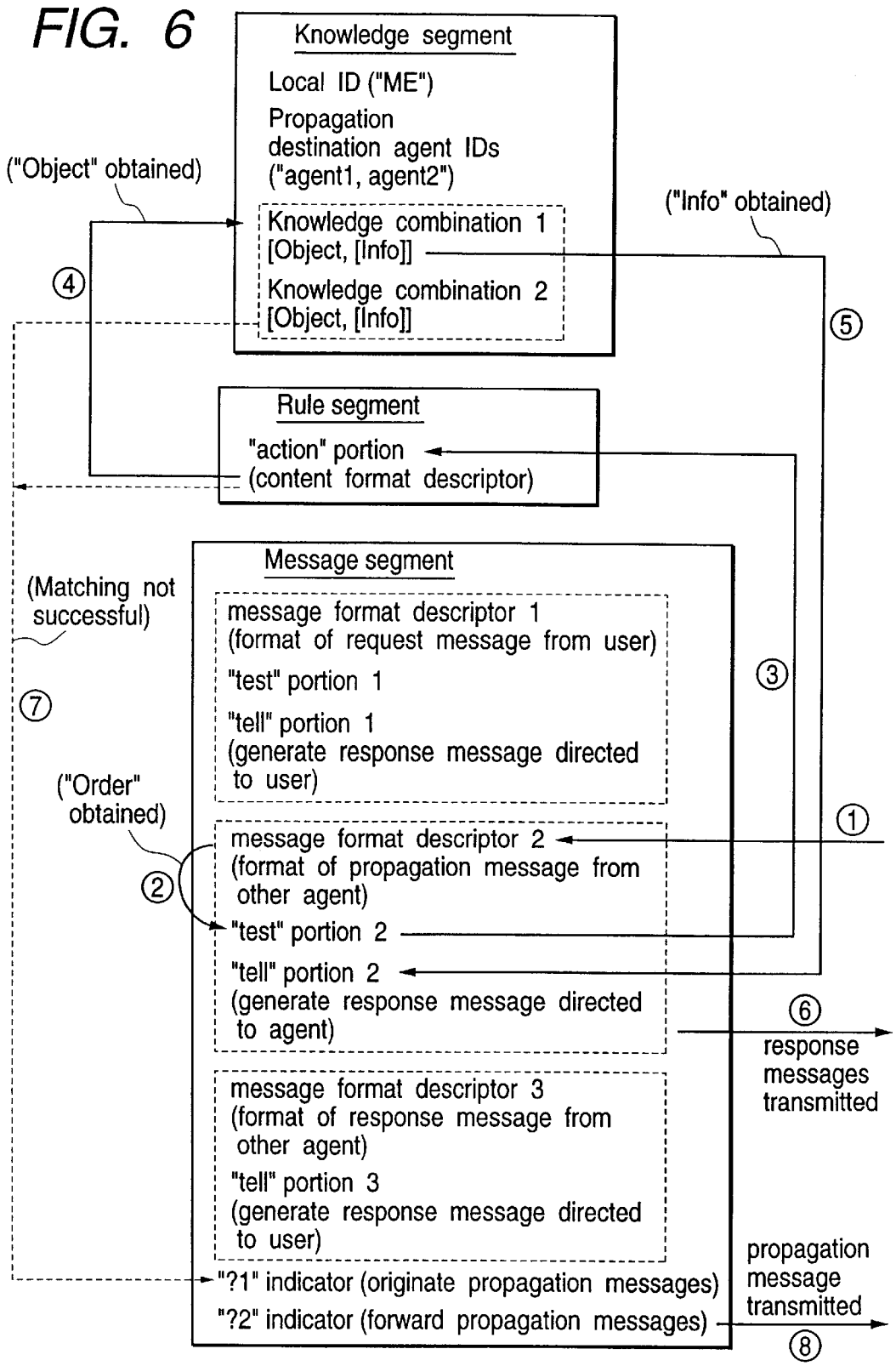
FIG. 6 is a conceptual diagram of operations executed by an agent through use of a script, for the case in which the agent receives a propagation message from another agent, and responds by generating a corresponding plurality of propagation messages, or by sending a response message to the agent which originated the received propagation message.
Figure 7:
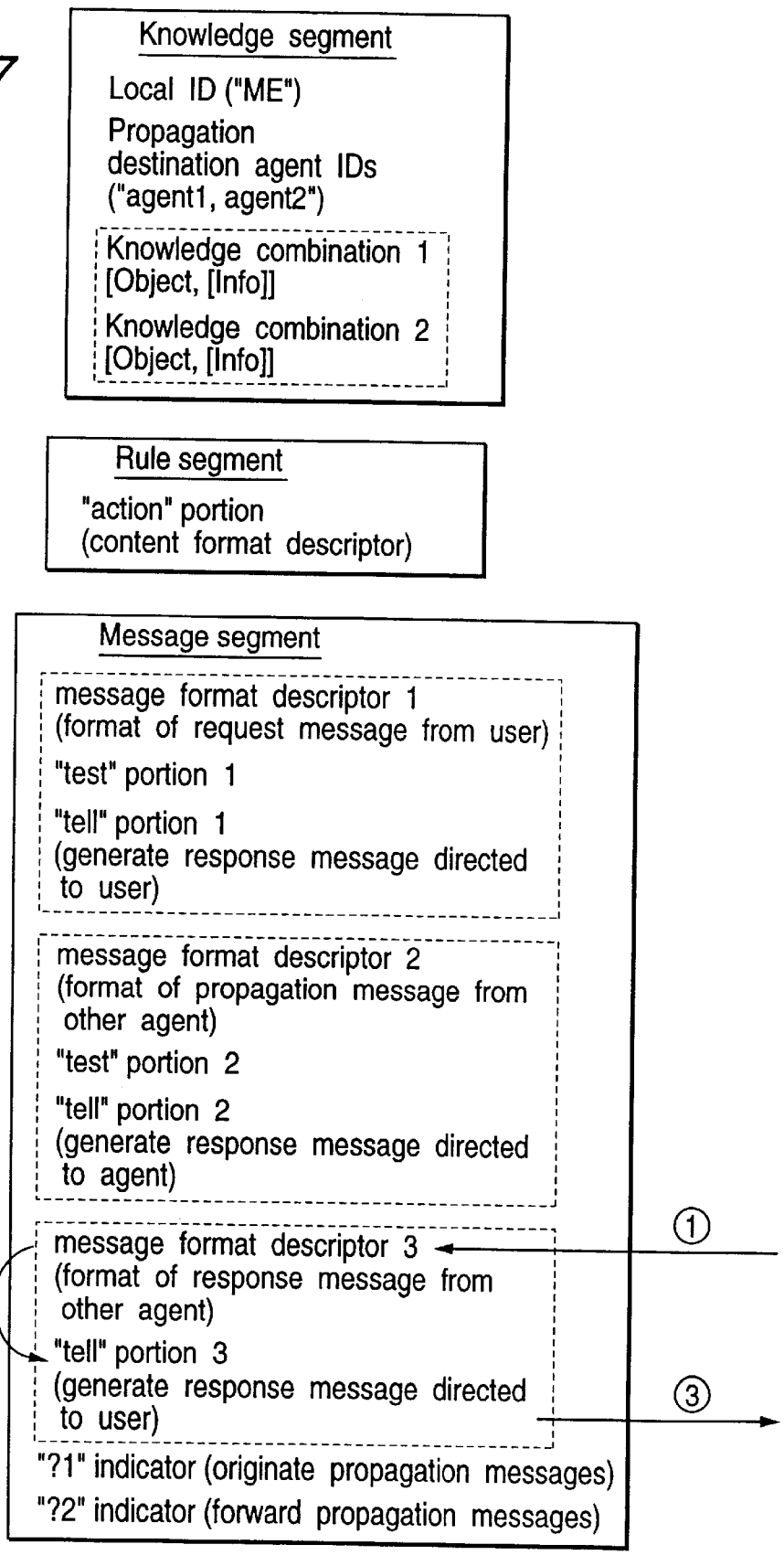
FIG. 7 is a conceptual diagram of operations executed by an agent through use of a script, for the case in which the agent receives a response message from another agent, and responds by generating a corresponding response message and sending that message to the appropriate user apparatus.

The configuration and manner of use of a script by an agent will be described in the following, referring first to FIGS. 3 and 4 which show respective simple examples of scripts which might be held in the script storage sections 103 of two agents having the respective identifiers agent1, agent2, and to FIG. 5 which conceptually illustrates the sequence in which the various parts of such a script are used, assuming that the agent receives an information request message from a user, with that sequence being indicated by the circled numerals. FIG. 6 is a corresponding conceptual diagram for the case of a propagation message being received, and FIG. 7 is a corresponding conceptual diagram for the case of a response message from another agent being received by an agent which had previously originated propagation messages.

A first segment of the script (referred to in the following as the Knowledge segment) contained between the delimiters "knowledge>" to "knowledge<" contains information which is specific to that agent, including the agent identifier (referred to elsewhere in the script by the variable name "Me", and the identifiers (indicated by "next1, next2", etc.) of a plurality of other agents which are assigned as propagation destination agents for this agent. The main part of the Knowledge segment is the actual database held by the agent, which is in the form of one or more combinations of a query item (indicated by the variable name "Object") and a response information set relating to that query item (indicated by the variable name "Info"). Such combinations will be referred to in the following as knowledge combinations. For simplicity of description each of the script examples shown herein contains only a single knowledge combination, however in practice, a plurality of these would be used.

A second segment of the script (referred to in the following as the Rule segment) contained between the delimiters "rule>" to "rule<" has one or more successive portions, each defining an action to be performed for handling the received request message. Each of these Rule portions is prefixed by the word "action". With this embodiment only a single "action" portion is shown, formed of:

(a) a content format descriptor (such as "[_,want,Object, info,_,_]") which defines a predetermined format for matching against the content portion of a message and which also indicates the position, within the message format, of the subject of the information request, i.e., the query item ("Object"), and (b) information indicating that the query item "Object" is to be matched against the contents of the Knowledge segment by inserting that query item into an expression "info([Object,[Info]])", which is to then be matched against the contents of the Knowledge segment, to obtain a desired response information set ("Info").

A third segment of the script (referred to in the following as the Message segment) contained between the delimiters "message>" to "message<" contains a plurality of message format descriptors, such as "ask(User,Me,Order)", against which a received message is to be matched, with each descriptor linked to a corresponding "tell" portion which defines how a response message is to be generated, if complete matching success is achieved for a message having that format. In addition, if the message format descriptor is for an information request message, the message format descriptor is also linked to a corresponding "test" portion, which defines how the contents of the received message are to be used in matching against the contents of the Rule segment.

The Message segment also includes a pseudo-format descriptor "?1", linked to information which defines how propagation messages are to be originated by this agent, and a pseudo-format descriptor "?2" which is linked to information that defines how a received propagation message is to be forwarded to other agents, as described in detail hereinafter.

For the purpose of explanation, it will be assumed that a user having the identifier user1 sends to agent1 a request message for information concerning a query item named videoB, i.e., a request message having the content portion: [I,want,videoB,info,_,_]), so that the entire message is of the form:

(user1,agent1,[I,want,videoB,info,_,_])

It will also be assumed that only agent2 holds the required information, i.e. agent1 holds only information relating to the item "videoA". Firstly, when the message is received by agent1, the entire message is matched against the contents of the Message segment of the script held by agent1. It is thereby found that the message matches the first content format descriptor "(User,Me,Order)" of the Message segment. The content portion "[I,want,videoB,info,_,_]" of the message is thereby obtained, i.e., as "Order" (numeral 2 in FIG. 5), and so the corresponding "test" portion is then executed to determine how to obtain response information to constitute the content portion of a response message. This is of the form:

test(action(Order,_,Response))

which signifies that the required response information ("Response") is to be obtained by applying Rule and Knowledge matching processing to the received message content portion ("Order").

Figure 5:
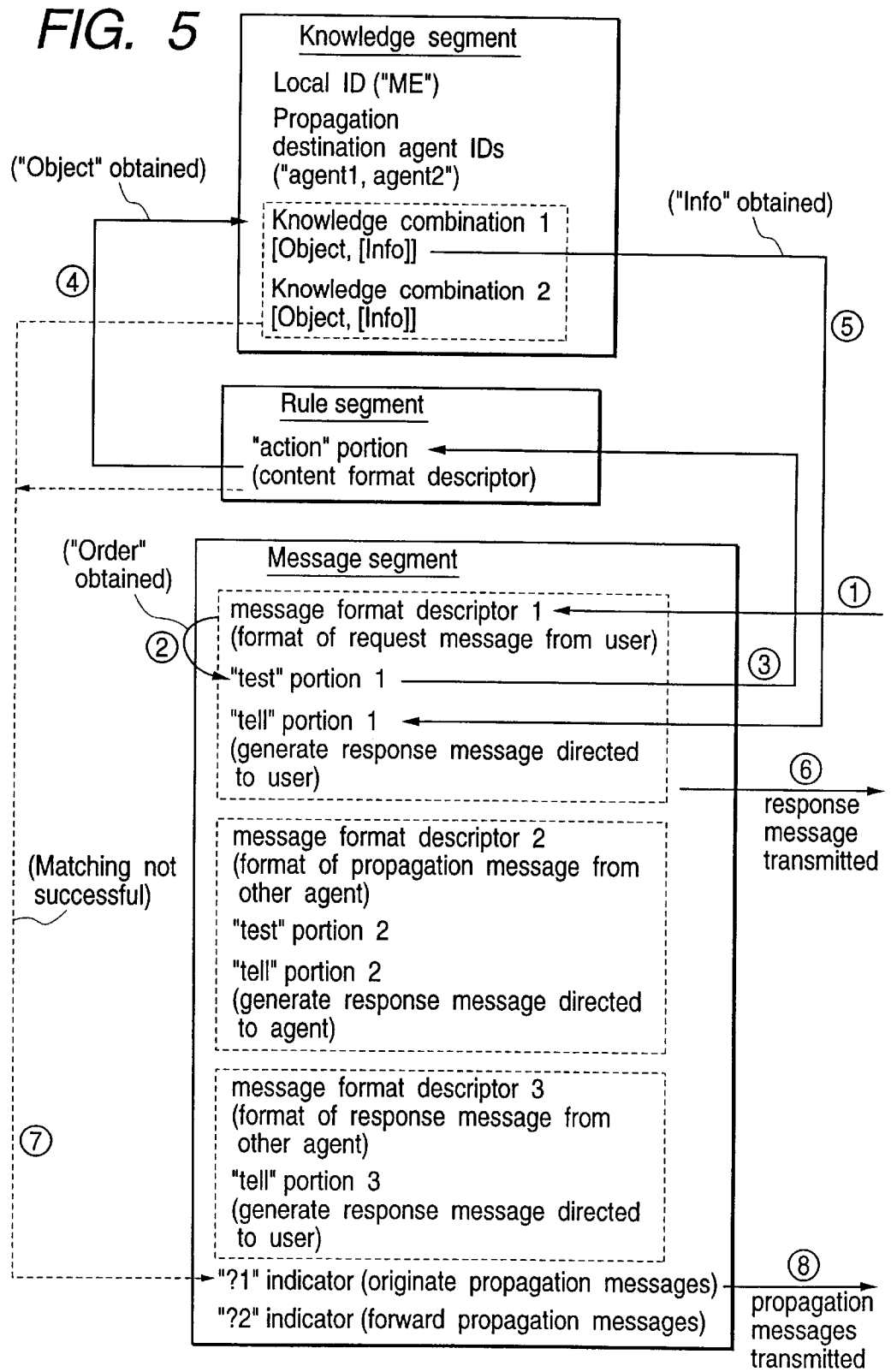
FIG. 5 is a conceptual diagram of operations executed by an agent through use of a script, for the case in which the agent receives an information request message from a user apparatus and responds by originating a plurality of propagation messages, or by sending a response message to the user apparatus.

The content portion "[I,want,videoB,info,_,_]" is then matched against the content format descriptor "[_,want, Object,info,_,_]", and the matching is successful, so the query item "Object" is obtained as "videoB" from the message (numeral 4 in FIG. 5).

That query item is then inserted into the aforementioned expression "info([Object,[Info]])", referred to in the following as the knowledge comparison expression, to thereby obtain "info([videoB,[Info])". (For the purpose of pattern matching against the Knowledge segment contents, this is of course actually "info([videoB,[_]), since "Info" has not yet been "info([videoB,[_]), since "Info" has not yet been obtained.) The resultant expression is matched against the Knowledge segment contents.

However since the Knowledge segment of agent1 does not contain information relating to the query item "videoB", the Knowledge matching will be unsuccessful. This is taken as signifying that the received message matches the pseudo-format "?1" (numeral 7 in FIG. 5), in which case the script indicates that respective propagation messages are to be originated by agent1, having the propagation destination agents designated by "next1", next2" in the Knowledge segment as their respective destination identifiers, with each propagation message having the content portion of the received message as its content portion, and each having agent1 as the sender identifier. These two propagation messages are then transmitted via the data communication network (numeral 8 in FIG. 5).

agent2 is one of the propagation destination agents of agent1, so that one of these propagation messages is received by agent2, i.e. as:

ask(agent1,agent2,[I,want,videoB,info,_,_])

which is found to match the message format descriptor for a propagation message, as indicated by numeral 1 in FIG. 6. The matching operations against the Rule and described above for the case of agent1, using the content portion of the received message, and its query item "videoB" (steps 2, 3, 4 in FIG. 6). In this case, since the Knowledge segment of the script of agent2 contains a knowledge combination having "videoB" as its "Object", i.e. the knowledge combination:

info([videoB,[price,is,_,$54, _]])

the response information set "[price,is, _,$54, _]" is thereby obtained as "Info" (numeral 5 in FIG. 6). A corresponding response message directed to agent1 is then generated by agent2 and transmitted via the network (numeral 6 in FIG. 6).

Referring to FIG. 7, that response message, i.e., tell(agent2,agent1,[price,is, _,$54,_])

is received by agent1 and is found to match the message format descriptor for a response message from an agent. The content portion, i.e. "Response" portion of that message is then extracted (numeral 2 in FIG. 7), the identifier of user1, (which was registered by agent1 at the time of generating the aforementioned propagation messages) is obtained, and the corresponding "tell" portion of the Message segment is then executed to generate a response message directed to the user concerned, i.e. as:

tell(agent1,user1,[price,is,_,$54,_])

That response message is then transmitted via the network to user1 (numeral 3 in FIG. 7), so that the user receives the required information.

However if in fact agent2 did not have the necessary information concerning the query item, (or if the content portion of the received propagation message did not match the content format descriptor of the "action" portion of the script held by agent2), so that complete matching success was not obtained (numeral 7 in FIG. 6), then this would be taken as indicating that the received message matches the pseudo-format designated as"?2". In that case, the following script portions are executed:

throw(next1,?2)
throw(next2,?2)

This signifies that the received propagation message is to be passed to each of the propagation destination agents of agent2, i.e. two propagation messages are to be generated, with their respective destination identifiers being those indicated by the designations "next1" and "next2" in the Knowledge segment, but which are otherwise identical to the received propagation message, so that the sender ID is left unchanged as that of the originating agent (agent1). These propagation messages would then be transmitted from agent2 via the network (numeral 8 in FIG. 6) to agent4 and agent5 respectively.

Thus, the sequence of operations which occur when user1 sends the aforementioned information request message concerning videoB to agent1, when agent1, agent2 respectively hold the scripts shown in FIGS. 3, 4 can be summarized as follows, as illustrated in the overall flow diagram of FIG. 8:

(1) user1 sends the message via the network to agent1, (2) The script execution section 102 of agent1 then reads out the script from the script storage section 103, to begin executing the script contents.

(3) The entire received message is matched against the message format descriptors in the Message segment of the script. Successful matching is achieved with the format descriptor "ask(User,Me,Order)".

(4) "action(Order,_,Response)" is matched against the contents of the Rule segment (where "Order" is the message content portion. Successful matching is achieved.

(5) The query item "videoB" is extracted from the message contents (as "Object"), and inserted in the knowledge comparison expression. The result is then matched against the contents of the Knowledge segment. matched against the contents of the Knowledge segment. No match is achieved.

(6) The propagation message generating section 104 of agent1 generates propagation messages, each containing the received message contents, directed to agent2 and agent3.

(7) A propagation message is received by agent2, and exn of the script held at agent2 is started. The message is found to match the second message format "ask(Sender,Me, Order). Rule and Knowledge matching processing are then executed as described above, to obtain the knowledge combination in the Knowledge segment corresponding to videoB, and thereby obtain the required information set [price,is,_,$54,_].

(8) The Message segment portion "tell(Me,Sender, Response)" is executed, to generate a a response message conveying the desired information to agent1, as "tell(agent2, agent1,[price,is,_,$54,_])", (9) The response message is received by the agent1, and matched against the Message segment content, whereby the message format is identified as being "tell(Sender,Me, Response)".

(10) A response message is generated as "tell(agent1, user1,[price,is,_,$54,_])" and passed to the message output section 105, to be As can be understood from the above, it is a feature of this embodiment that processing of a received information request message, by executing the script which is held by an agent, is performed by successive pattern matching operations, which are executed in the basic sequence "Message, Action, Knowledge" against the contents of the respective segments of the script. If any result occurs other than a completely successful match with the received message, whereby a response message can be generated, then the agent redirects the received message contents to one or more other agents, as a propagation message.

Figure 9:
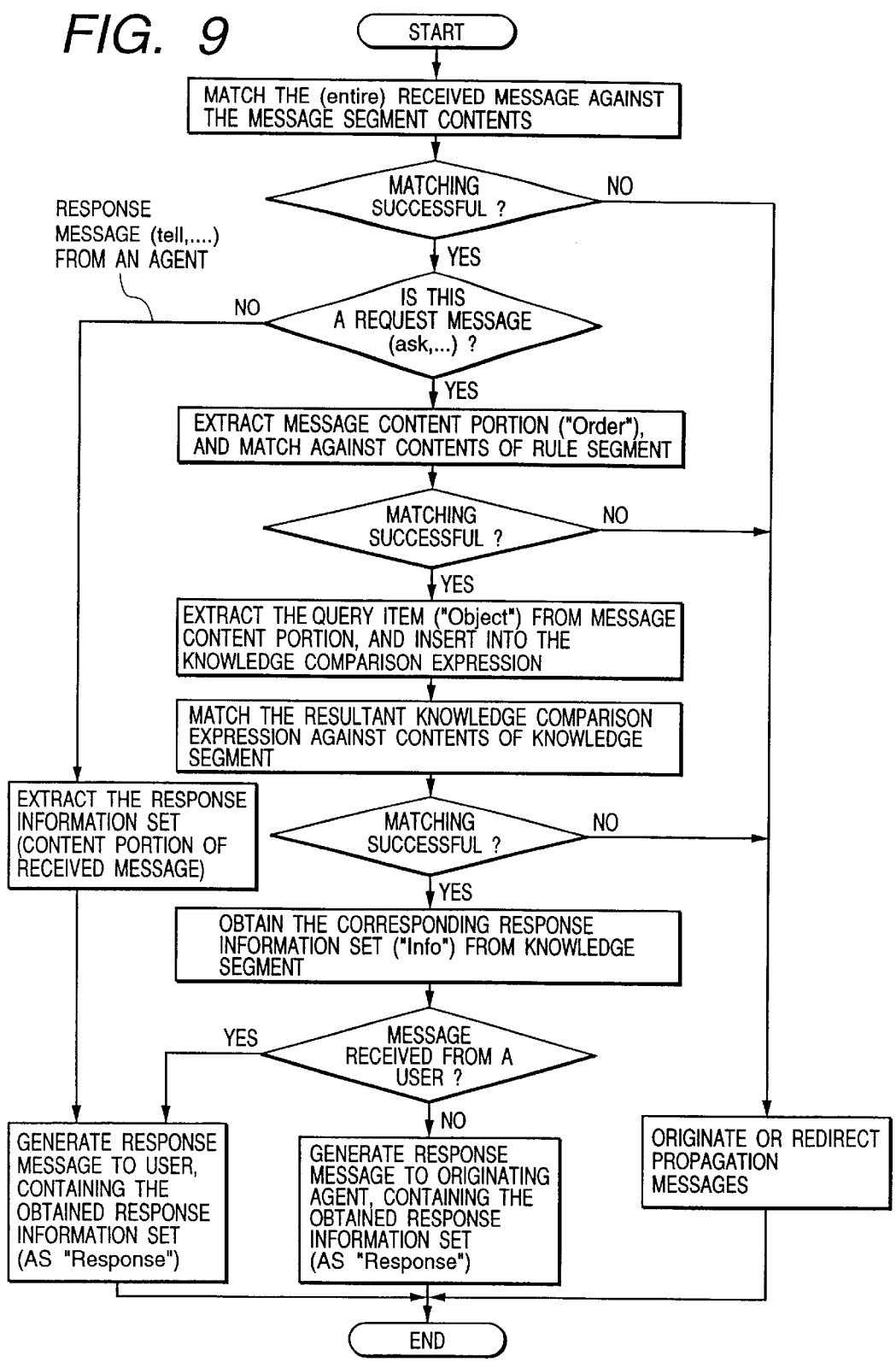
FIG. 9 is a flow diagram illustrating successive matching operations using the Message, Rule and Knowledge segments of a script, which are executed by an agent of the first embodiment in response to each of the possible types of message which may be received.

In FIG. 9, to simplify the diagram, a received request message from a user and a received propagation message are referred to in common as a "request message", since identical matching processing is applied in each case.

Figure 8:
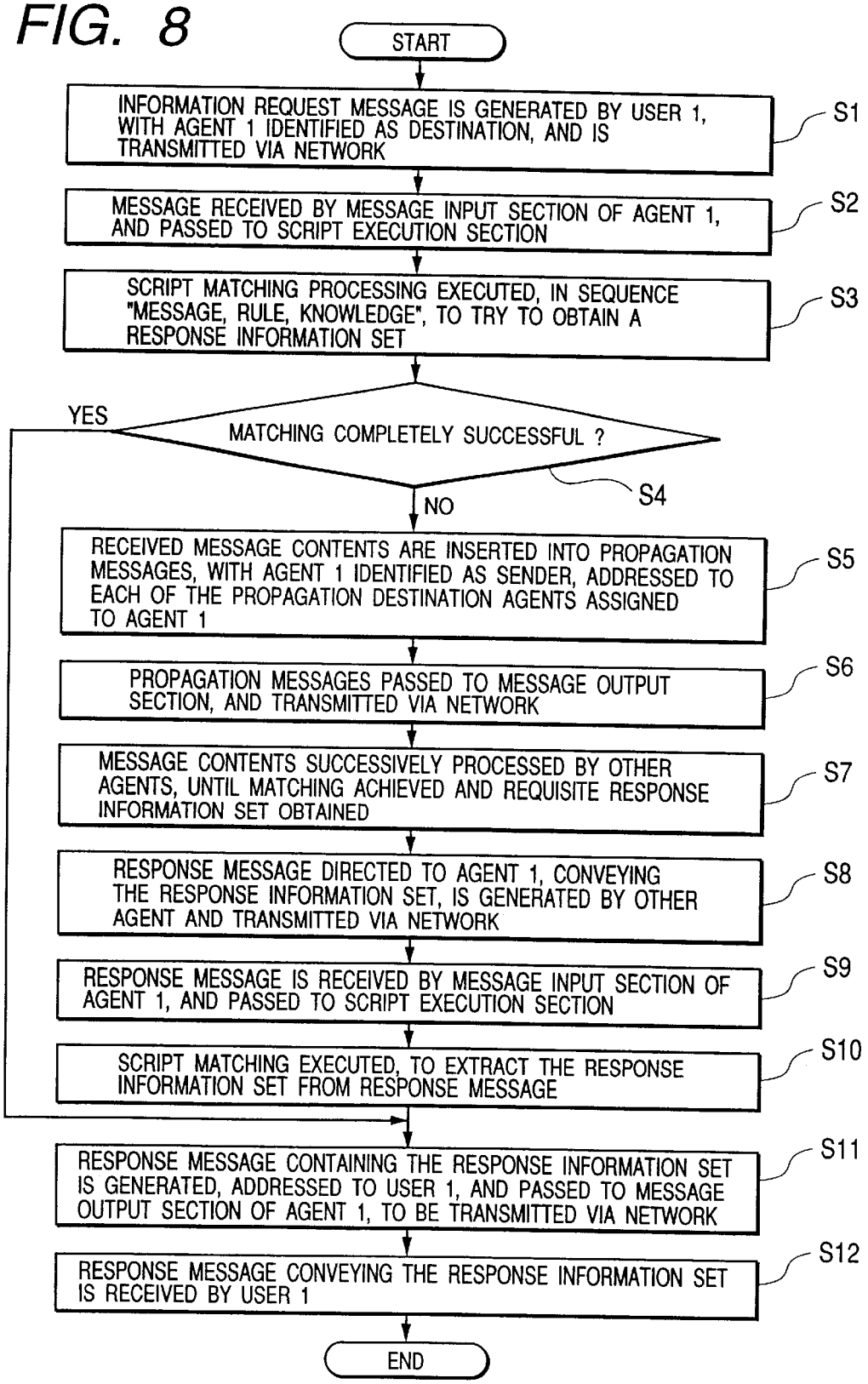
FIG. 8 is a flow diagram illustrating the overall flow of operations occurring within the system of the first embodiment, in response to an information request message transmitted from a user apparatus.

It should also be noted that in the overall system processing flow diagram of FIG. 8, step S7 actually represents all of the processing operations which may be executed to transfer a propagation message one or more times between successive agents, until matching is achieved and the required response information set is obtained.

Figure 10:
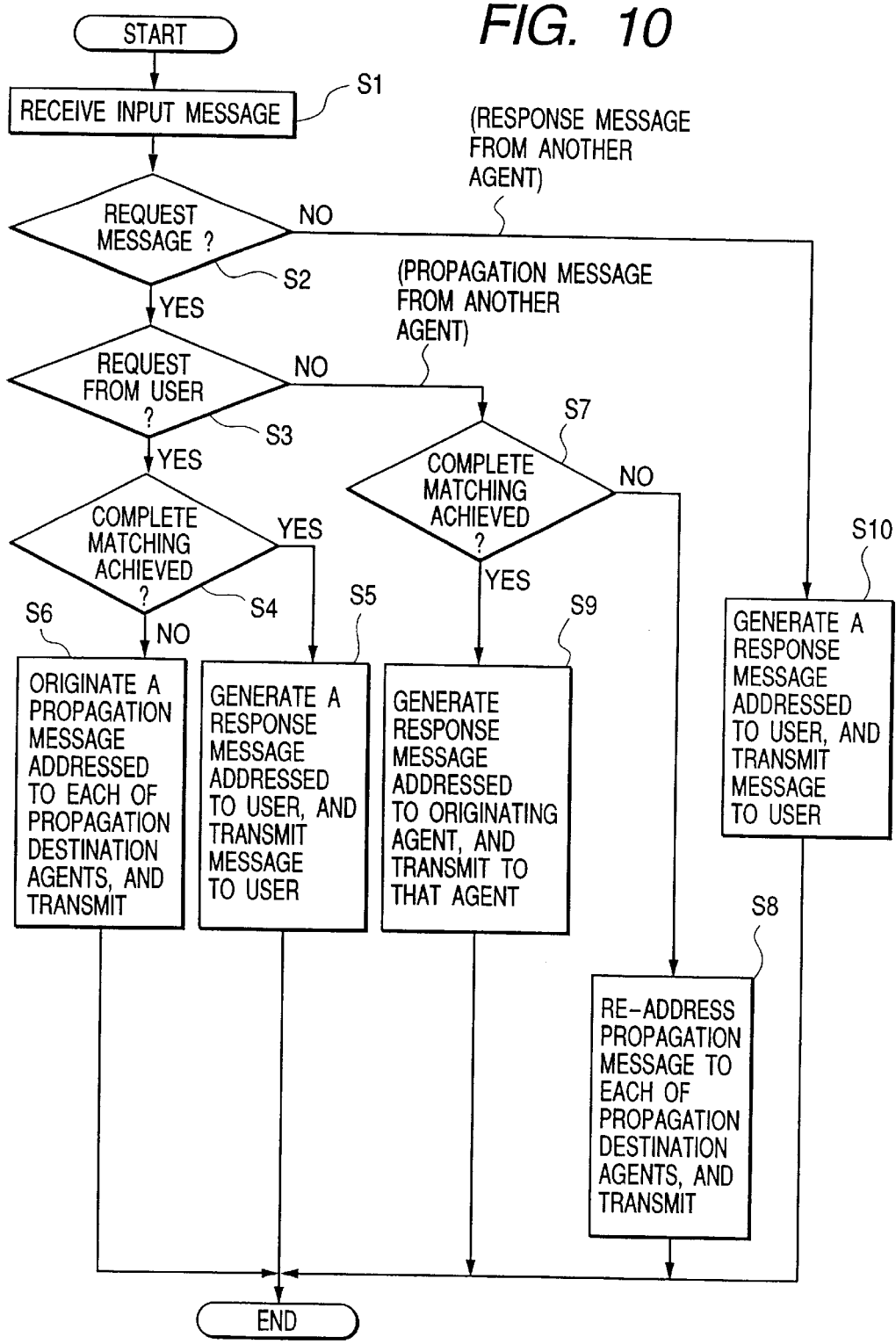
FIG. 10 is a flow diagram illustrating the overall flow of operations executed by an agent of the first embodiment, in response to each of the possible types of message which may be received.

FIG. 10 is a flow diagram for illustrating the basic overall operation of an agent of this embodiment, showing the respectively different processing sequences which are applied by the agent, depending upon the type of a received message. In FIG. 10, steps S4 and S7 each actually represent execution of the aforementioned sequence of Message segment, Rule segment and Knowledge segment matching processing applied to the received message, and a decision as to whether all of that matching has been successful and a response information set thereby obtained, as described for the first embodiment and shown as steps S3, S4 in FIG. 8.

From the above description of the first embodiment it can be understood that this embodiment enables a plurality of knowledge provider agents, which are connected for exchange of messages via a communication network but otherwise operate mutually independently of one another, to constitute a distributed knowledge base server system, whereby all of the knowledge information held at each of the agents is available to any user of the system, and that this is achieved in a very simple manner, with no need for any form of centralized control of the system.

It will be understood that the invention enables information access security to be managed in a simple way. That is to say, restriction of access to the knowledge base held by an agent can be very easily implemented with the embodiment described above, since for example a password can be inserted into the content format descriptor of an "action" portion of a script, thereby ensuring that access to the corresponding Knowledge segment will be restricted to request messages which contain the password in the appropriate position.

A second embodiment of the invention will be described referring first to the general system block diagram of FIG. 11. In addition to the functions described hereinabove for the first embodiment, whereby a response information set can be obtained by a user from an agent, this embodiment has a further function whereby an agent can acquire from another agent specific message processing information, such as a knowledge combination relating to a specific query item, for insertion into the Knowledge segment of the script held by the requesting agent, or an "action" portion to be inserted into the Rule segment of that script. With the script examples of FIGS. 3, 4, for example, agent1 holds the necessary Rule segment contents required for processing the request message

[I,want,videoB,info,_,_]

but does not hold the necessary Knowledge segment contents. With the second embodiment, a user can send a message (referred to in the following as a processing information acquisition request message) to a specific agent (e.g., the agent which is closest to that user, within the network) for requesting that agent to acquire Rule and/or Knowledge information that are necessary for providing information relating to a particular message content portion. In that way it can be made unnecessary for that agent to repeatedly generate propagation messages whenever request messages containing that content portion are received.

Figure 11:
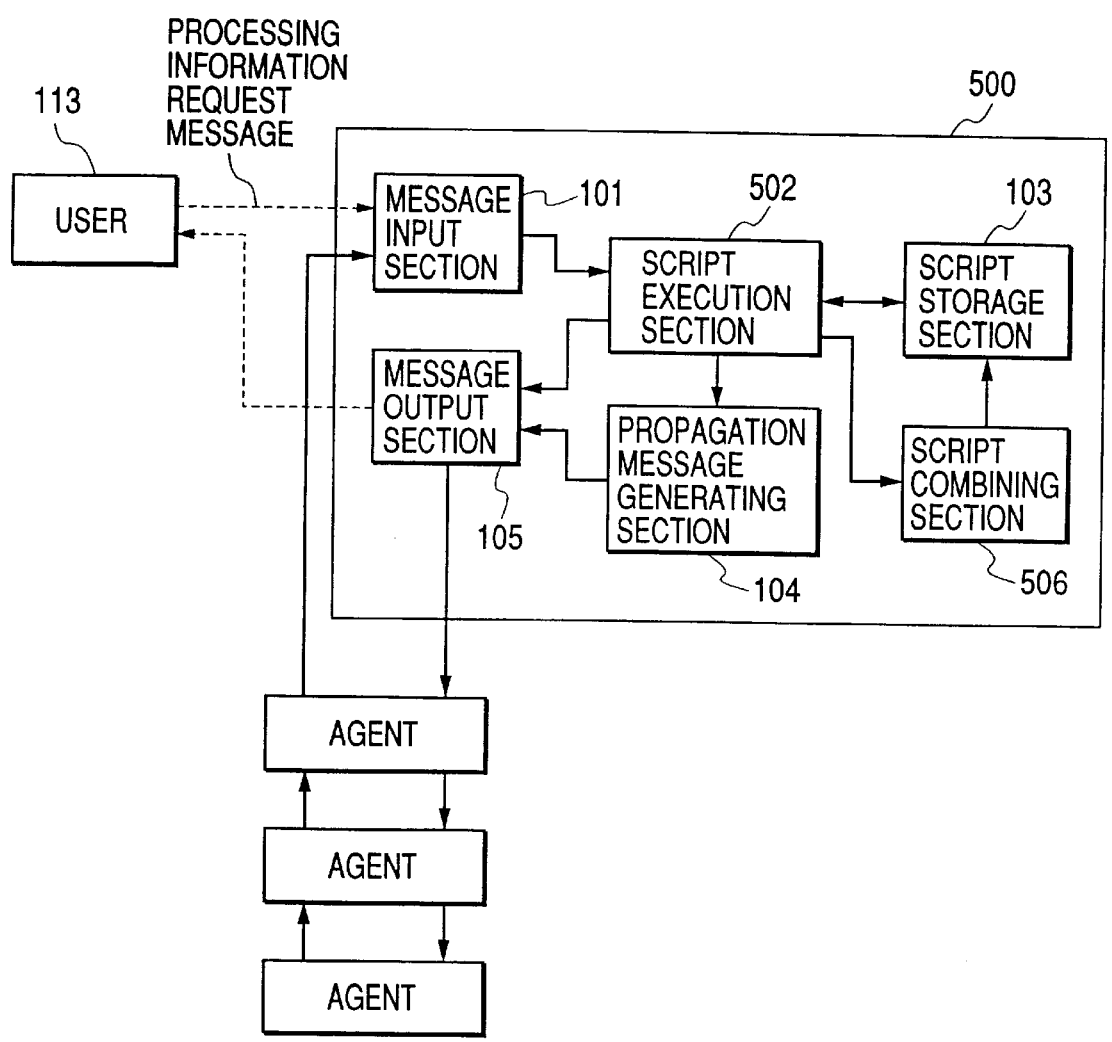
FIG. 11 is a general system block diagram of a second embodiment of a knowledge provider system according to the present invention, whereby an agent can respond to a command message sent from a user apparatus, by acquiring message processing information that is held by another agent of the system.

FIG. 11 is a general system block diagram showing the basic components of this embodiment. Since this embodiment is essentially an extension of the first embodiment, only the points of difference between the operation of this embodiment and that of the first embodiment will be described in the following. In FIG. 11, the functions of each of the message input section 101, script storage section 103, propagation message generating section 104, and message output section 105 of an agent 500 are respectively identical to those of the correspondingly numbered blocks in the diagram of FIG. 1B, however the structure of the script which is held in the script storage section 103 differs from that of the first embodiment, as described hereinafter. In addition, the agent 500 includes a script combining section 506. Each of the other agents of the system has an identical configuration and operation to that of agent 500.

The function of the script combining section 506 is to insert into the appropriate segment or segments of the script held in the script storage section 103 any additional message processing information which is acquired as described in the following.

FIG. 12 shows an example of the script which is held in the script storage section 103. In FIG. 12, the eight lines of the Message segment of the script of FIGS. 3, 4, extending from text="ask(User,Me,Order)", to tell(Me,User,Response)

have been abbreviated, and only one of the propagation destination agents ("next1") is indicated, in order to simplify the diagram, however it should be understood that this embodiment incorporates all of the script features and all of the functions of the first embodiment described above.

With this embodiment, if an agent receives a message of the form:

ask_rule(Sender,Me,Order)

then this signifies a request from another agent, to send the portion of a Rule segment (i.e., an "action" portion) that is necessary for processing the content portion (indicated as "Order") of the received message. Similarly, a message of the form:

ask_knowledge(Sender,Me,Order)

signifies a request to send a knowledge combination corresponding to the query item that is contained in the message content portion, while a message of the form:

ask_rule_knowledge(Sender,Me,Order)

constitutes a request to send both the "action" portion and knowledge combination that are necessary for processing the content portion of that message.

Figure 14:
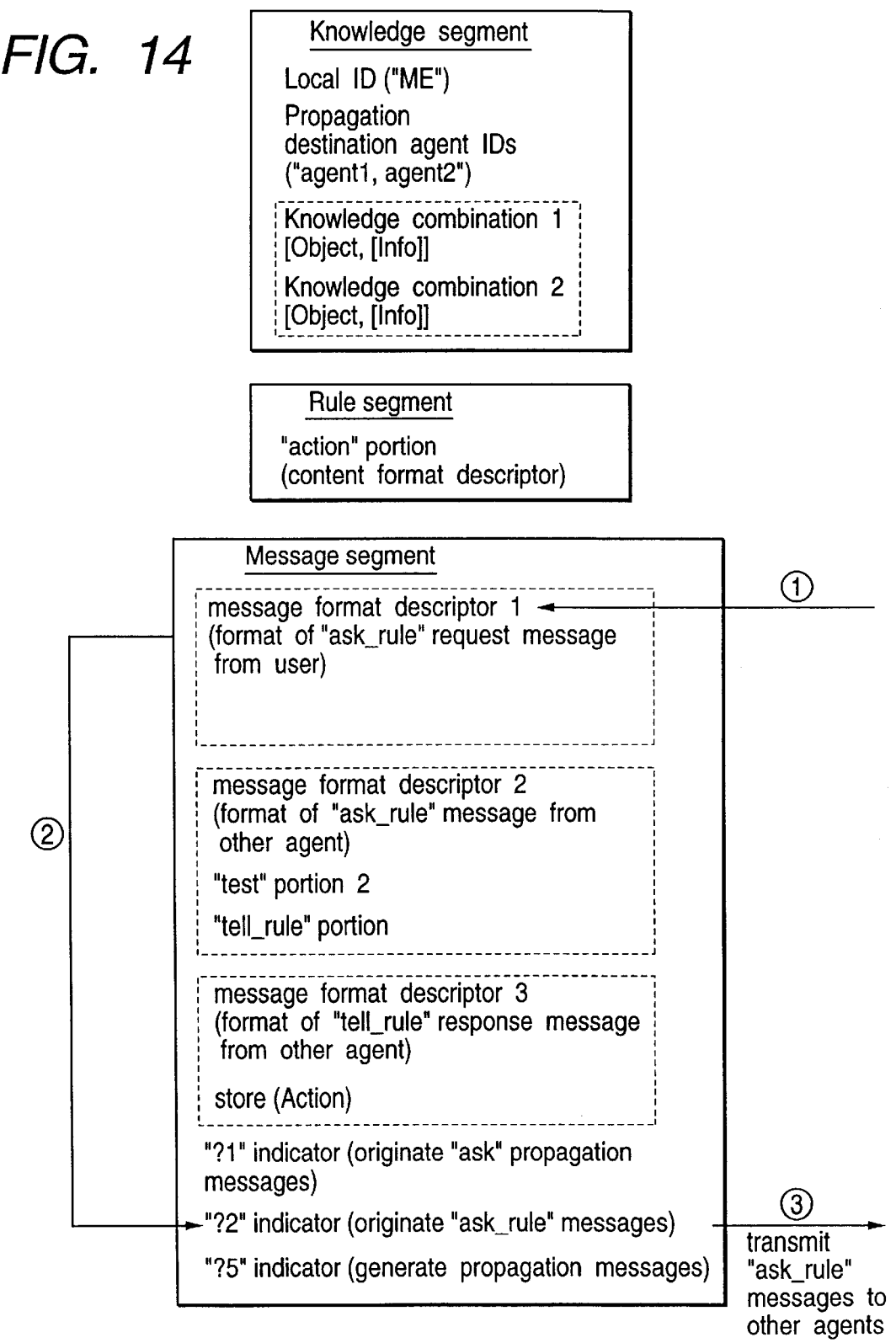
FIG. 14 is a conceptual diagram of script-based operations executed by an agent of the second embodiment, for the case in which the agent receives a processing information acquisition request message from a user apparatus.
Figure 15:
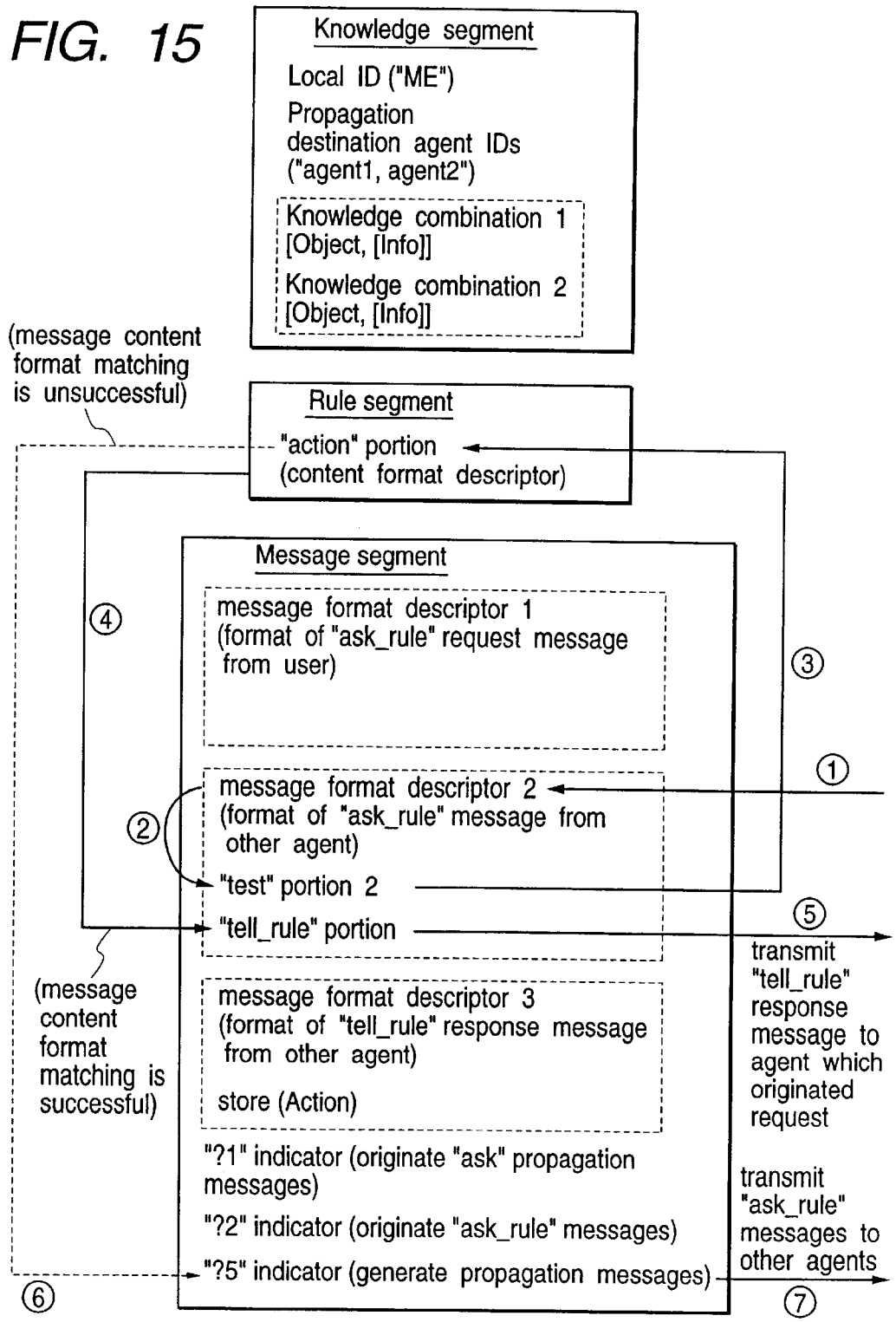
FIG. 15 is a conceptual diagram of script-based operations executed by an agent of the second embodiment, for the case in which the agent receives a processing information acquisition message from another agent.
Figure 16:
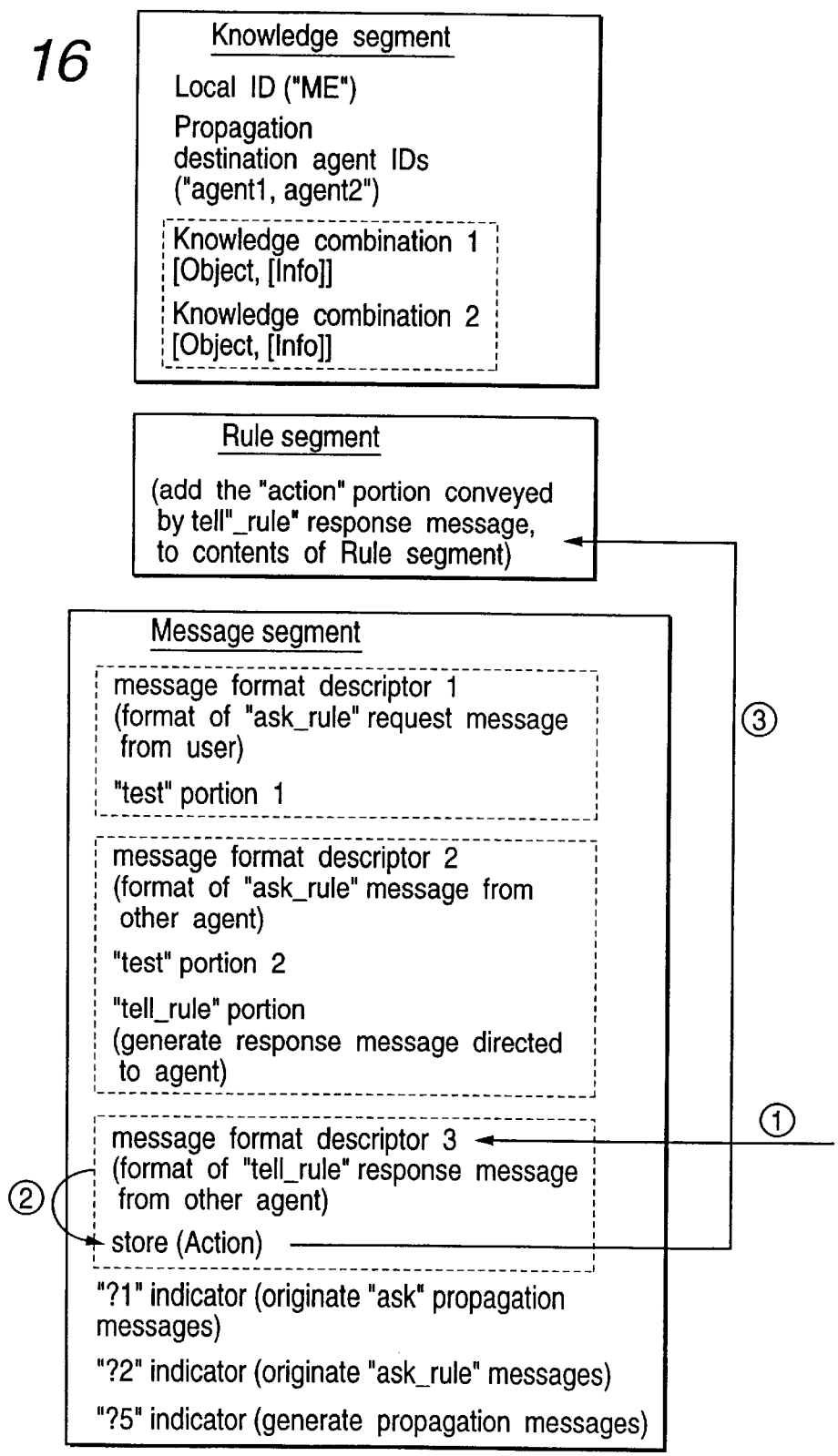
FIG. 16 is a conceptual diagram of script-based operations executed by an agent of the second embodiment, for the case in which the agent receives a processing information response message, and responds by storing the received message processing information.

FIG. 14 is a conceptual diagram for illustrating how the script is utilized by an agent, with this embodiment, taking the example of an "ask_rule . . . " type of processing information acquisition request message being sent to the agent from a user. FIGS. 15 and 16 are corresponding conceptual diagrams, for the case of an agent receiving an "ask_rule" type of processing information acquisition message sent from another agent, and the case of an agent receiving a "tell_rule" type of processing information response message, after having originated and sent out processing information acquisition messages of the form "ask_rule" to each of its propagation destination agents.

Figure 13:
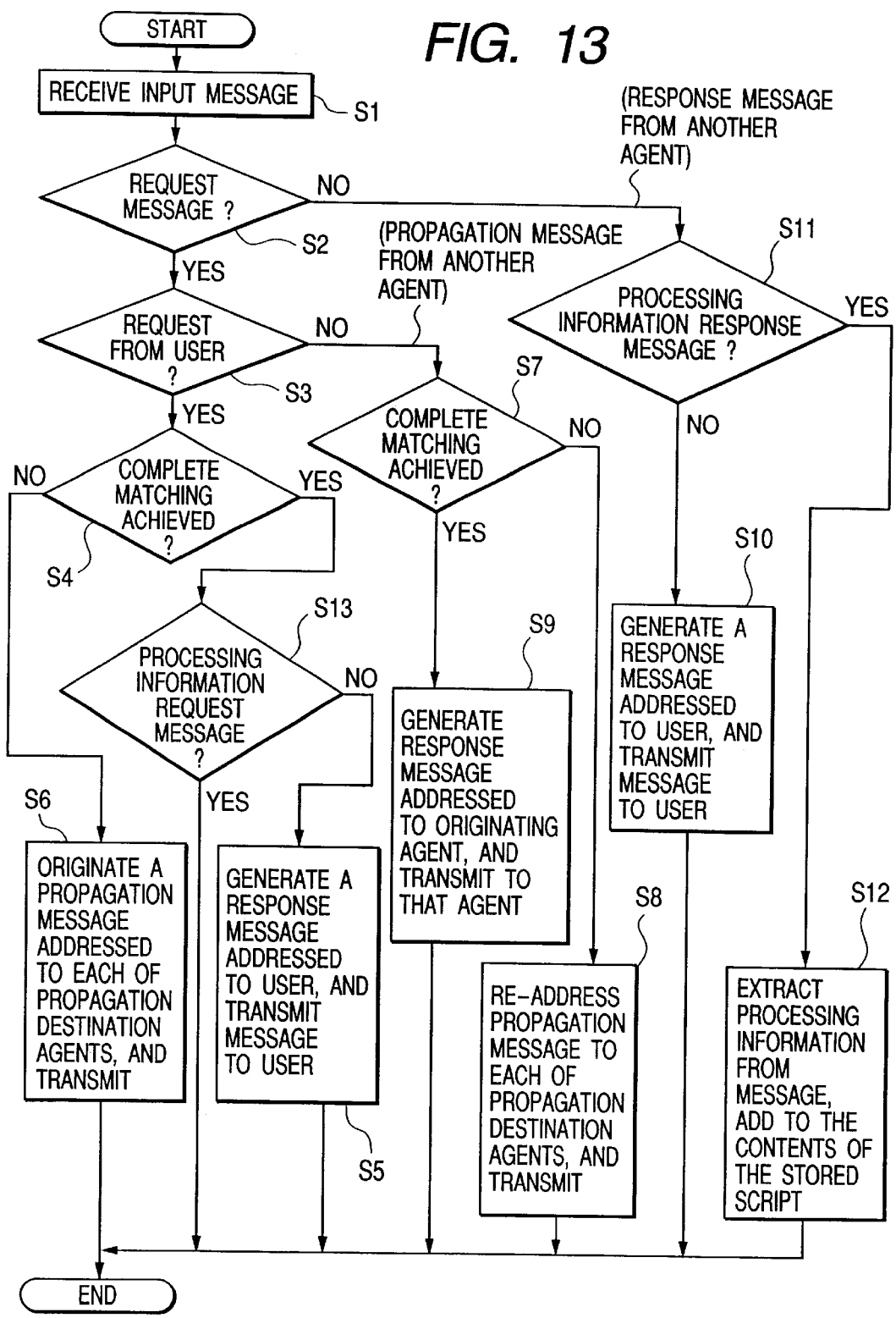
FIG. 13 is a flow diagram illustrating the overall flow of operations executed by an agent of the second embodiment, in response to each of the possible types of message which may be received.

FIG. 13 is a flow diagram showing the various operation sequences which are executed by an agent of this embodiment, in response to each of the possible types of message which can be received. In FIG. 13, steps S4 and S7 each actually represent execution of the aforementioned sequence of Message, Rule and Knowledge segment matching processing applied to the received message, and a decision as to whether all of that matching has been successful and a response information set thereby obtained, as described for the first embodiment and shown as steps S3, S4 in FIG. 8.

Referring to FIGS. 12, 13, 14 and assuming that a message:

ask_rule(user1,agent1,[I,want,videoB,info,_,_]) is received by agent1, that message is found to match the "ask-rule . . . " message format descriptor of the Message segment of agent1 (numeral 1 in FIG. 14), and this is interpreted as signifying the message format matches the "?2" pseudo-format (numeral 2 in FIG. 14), so that agent1 will then originate a set of processing information acquisition messages of the form "ask_rule(Me,nextN,Order)", where "Order" signifies the content portion of the received processing information acquisition request message, and nextN is the identifier of a propagation destination agent, for example:

ask_rule(agent1,agent2,[I,want,videoB,info,_,_])

These propagation messages are then transmitted via the network (numeral 3 in FIG. 14) to the respective propagation destination agents of the originating agent. When such a propagation message is received by agent2, it executes Message matching of the received message, and Rule matching of the content portion ([I,want,videoB,info,_,_]) of that message as described for the first embodiment, as indicated by numerals 1, 2 and 3 in FIG. 15. Assuming that both of these matching operations are successful, since the contents of the "test" portion linked to the message format descriptor for the received message is in this case:

action (Order ,Action, Response)

this signifies that the message content portion ("Order") is to be used to obtain the corresponding "action" portion of the Rule segment, for use as the content portion ("Response") of a response message. For that reason, agent2 would, when the Message and Rule matching are both successful in this case, generate a response message of the form:

tell_rule(Me,Sender,action(Order,Action,Response))

as indicated by numerals 4, 5 in FIG. 15. Assuming that the Rule segment contents the script of the responding agent is of the form shown in FIGS. 3, 4, this response message would actually be:

tell_rule(agent2,agent1,
 ([_,want,Object,info,_,_],
  [know:info([Object,[Info]]),Info))

If on the other hand Rule matching is not successful, i.e. the content portion of the received message does not correctly match the content format descriptor of the script held by this agent, then as indicated by numerals 6, 7 in FIG. 15, the received message is interpreted as matching the "?S" pseudo-format, so that a set of propagated processing information acquisition messages would be generated by that agent (in the same way as for generation of propagation messages with the first embodiment described above), and sent to the propagation destination agents of that agent.

For example, if agent2 has a propagation destination agent having the identifier agent3, and receives the above processing information acquisition message example, with matching being unsuccessful, then agent2 would generate a processing information acquisition message:

ask_rule(agent1,agent3,[I,want,videoB,info,_,_])

FIG. 16 illustrates how the script is used to handle a "tell_rule . . . " processing information response message when it is received, e.g., by agent1. When it is found that the message matches the "tell_rule . . . " message format descriptor (numeral 1 in FIG. 16), the next part of the script ("store(Action)") signifies that the content portion of the received message is to be passed to the script combining section 506, to be stored in the script storage section 103 as a new "action" portion of the Rule segment (numeral 3 in FIG. 16).

In a similar way, when an "ask_knowledge . . . " type of processing information acquisition request message is received by an agent of this embodiment from a user, the agent will generate corresponding "ask knowledge . . . " processing information acquisition messages which are sent out to its respective propagation destination agents. When an agent receives such a message and all of the Message, Rule and Knowledge matching processing is successful, so that a knowledge combination corresponding to the received message content portion is found, that agent generates a response message of the form:

tell_knowledge(Me,Sender,Knowledge), where "Knowledge" signifies the obtained knowledge combination. Thus for example agent2 might respond to such a "ask_knowledge . . . " processing information acquisition message from agent1 by generating the message:

tell_knowledge(agent2,agent1,[videoB,[price,is,_, $54_,_]])

When received by agent1, the content portion of that message, i.e., the knowledge combination "[videoB,[price,is,_,$54_,_]]" would then be extracted from the received message and inserted into the Knowledge segment of agent1, as:

info([videoB,[price,is,_$54,_,_]])

In that way, agent1 would thereafter be able to respond directly to a request for information concerning the query item videoB, without the need to generate propagation messages as described hereinabove for the first embodiment, so that the delay involved in sending propagation messages to other agents and waiting for a corresponding response message can be eliminated when desired.

In the case of an agent sending a processing information request message of the form "ask_rule_knowledge(Sender, Me,Order)", it will be understood that the operation would be a combination of the forms of operation described above for obtaining Rule information and Knowledge information by separate request messages, so that detailed description will be omitted. That is to say, such a request message would be propagated to successive agents, until an agent is reached which has both the necessary Rule and Knowledge information contained in its script.

It can thus be understood that, in addition to the functions provided by the first embodiment, this embodiment further enables an agent to originate processing information acquisition messages, i.e. a type of propagation message which are sent to other agents in order to obtain processing information that is necessary for performing Rule matching of a specific message content portion (such as [I,want, Object,info,_,_], or performing Knowledge matching for a content portion containing a specific query item (such as "videoB"), or for obtaining both of these types of processing information. In the same way as for propagation messages, as described for the first embodiment hereinabove, the processing information acquisition messages will be successively relayed to one or more other agents, with the identifier of the originating sender being held unchanged as the message sender identifier, until an agent is reached which can provide the necessary message processing information, and which will then send the information to the originating agent, as the content portion of a response message.

Although the above embodiment has been described assuming that each of the three possible types of message processing information can be requested and obtained by an agent, it would of course be equally possible to configure the system such that only one type of message processing information (such as Knowledge information) can be requested, or that only the type of processing information acquisition message for requesting both Rule and Knowledge information can be generated.

Figure 17:
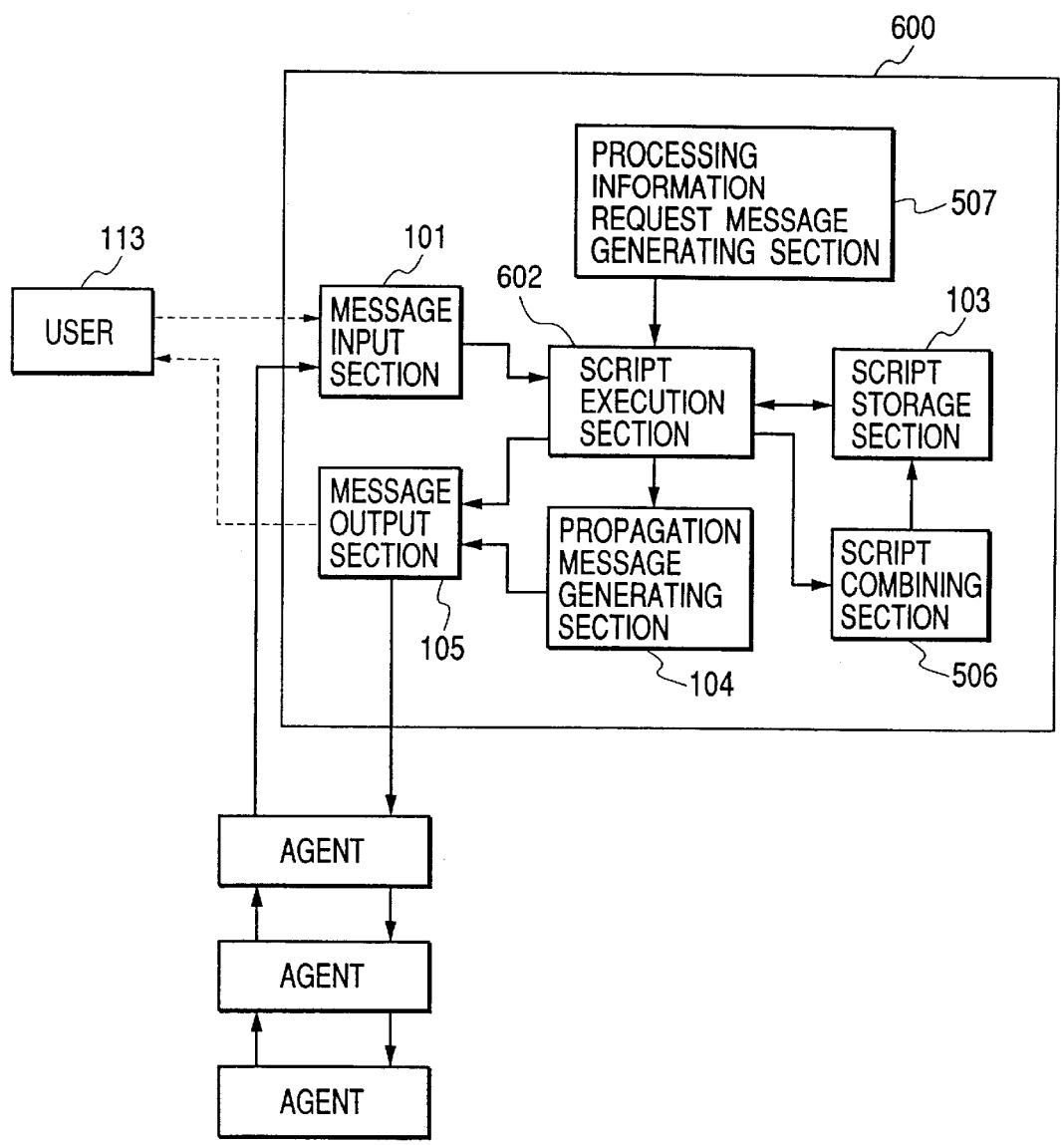
FIG. 17 is a general system block diagram of a third embodiment of a knowledge provider system according to the present invention, whereby an agent can initiate operations for acquiring message processing information that is held by another agent of the system.

A third embodiment will be described, which is an alternative version of the second embodiment. With the third embodiment, each agent can itself initiate the sending of a request message for message processing information. FIG. 17 is a general system block diagram of this embodiment, which differs from the previous embodiment in that each agent itself determines when it is necessary to acquire processing information from other agents. For that purpose, each agent 600 includes a processing information request message generating section 507. For simplicity of description it will be assumed that the processing information request message generating section 507 operates by commanding the script execution section 602 to acquire processing information each time that the agent 600 generates a propagation message in response to an information request message from a user. However various other criteria could be envisaged for determining when the processing information request message generating section 507 will cause processing information acquisition messages to be generated and transmitted by the agent.

FIG. 18 shows an example of the script which would be held in the script storage section 103 of an agent of this embodiment. This is identical to the script example of FIG. 12, other than in that the Message segment does not contain any message format descriptor corresponding to processing information acquisition request messages from users.

Figure 19:
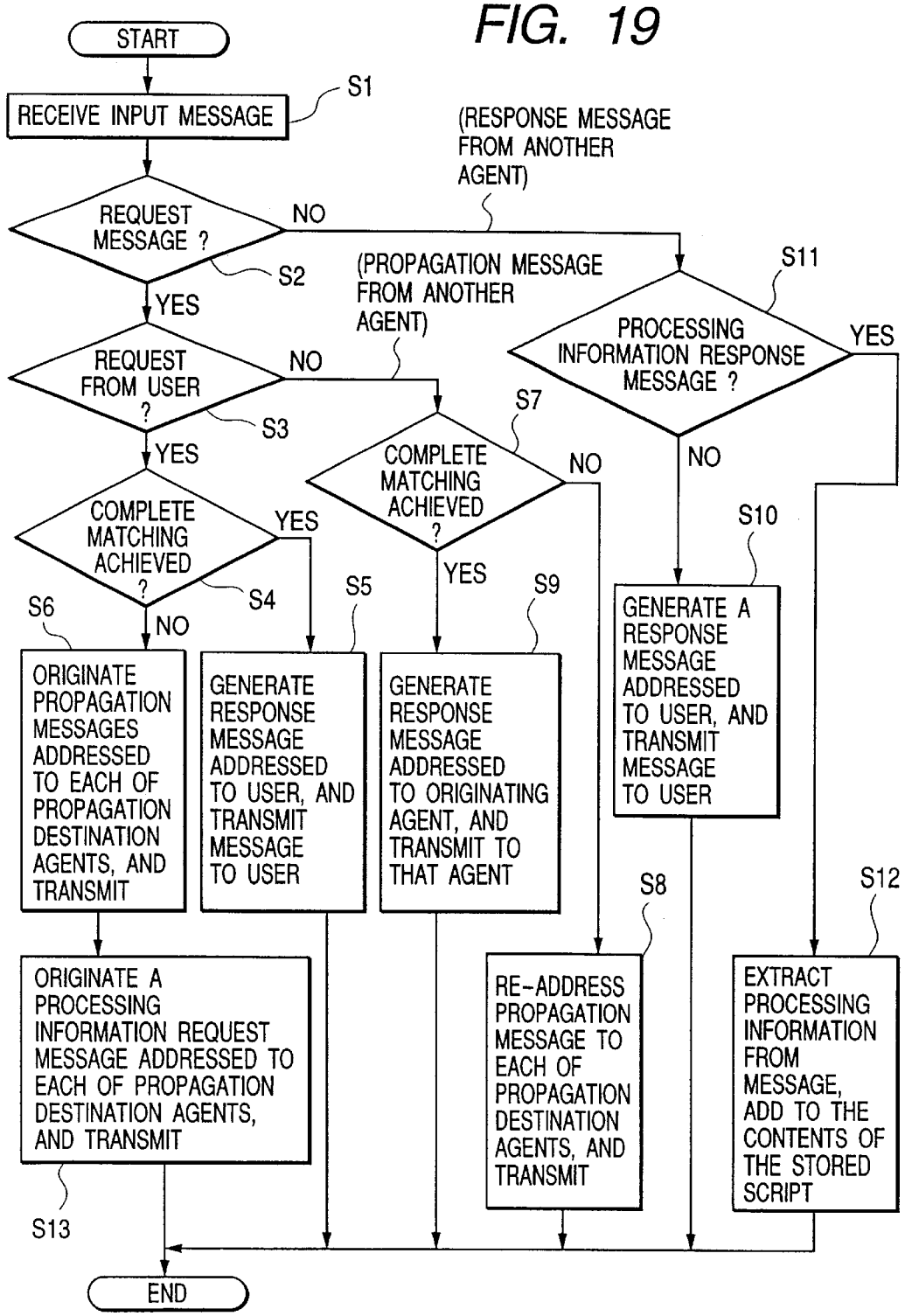
FIG. 19 is a flow diagram illustrating the overall flow of operations executed by an agent of the third embodiment, in response to each of the possible types of message which may be received.

FIG. 19 is a flow diagram illustrating the basic operation sequence executed by an agent of this embodiment, in response to each of the possible messages which it can receive. As shown, if a step S6 is executed to generate a propagation message (i.e., when complete matching has been achieved the received message), then a step S13 is also executed, whereby a set of processing information acquisition messages are automatically generated (obtain Rule and/or Knowledge information) as described for the preceding embodiment,and sent to each of the propagation destination agents. The subsequent operation is identical to that described for the preceding embodiment, so that detailed description will be omitted. In FIG. 19, steps S4 and S7 each actually represent execution of the aforementioned sequence of Message, Rule and Knowledge segment matching processing applied to the received message, and a decision as to whether all of that matching has been successful and a response information set thereby obtained, as described for the first embodiment and shown as the combination of steps S3, S4 in FIG. 8.

Figure 20:
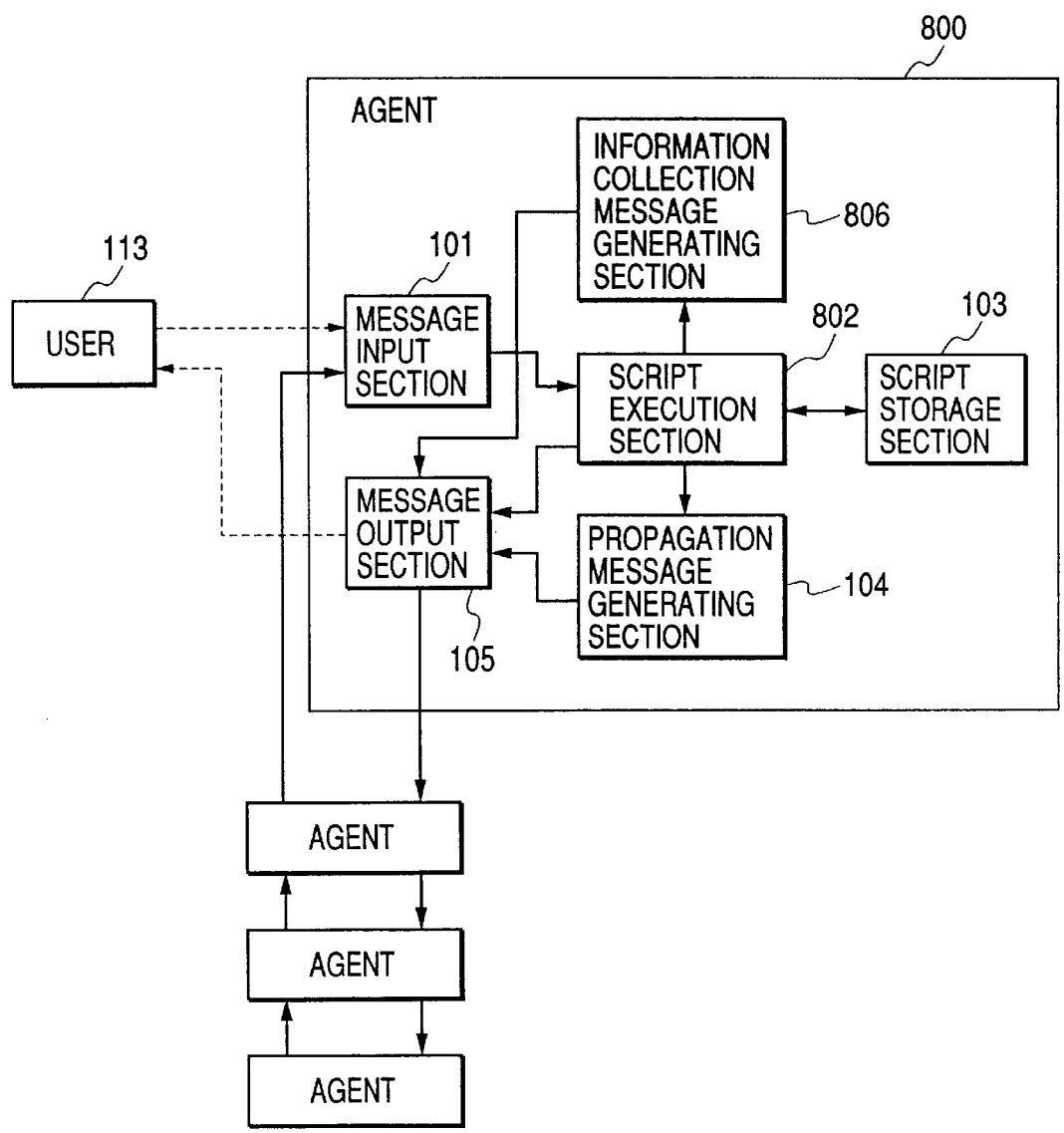
FIG. 20 is a general system block diagram of a fourth embodiment of a knowledge provider system according to the present invention, whereby an agent can respond to a command message from a user apparatus to collect respective response information sets, relating to a specific query item, from other agents of the system.

A fourth embodiment of the invention will be described in the following, whereby a user can send a message requesting respective sets of information concerning one specific query item from a specific number of agents. Thus taking the example of agent1, agent2 having the script contents shown in FIGS. 3, 4, with the fourth embodiment it becomes possible for a user not only to obtain the response information set concerning the item "videoB" that is held by agent2, but also to obtain the respective sets of information concerning that item which are held by a number of other agents. To do so, a user generates and sends to an agent an information collection request message having the format: "ask_all(User,Agent,Count,Order)". Here, "Count" is a number whose initial value determines the number of agents from which response information sets are to be obtained. FIG. 20 is a general system block diagram of this embodiment. As shown, the configuration of an agent 800 is similar to that of an agent of the first embodiment, but differs by including an information collection message generating section 806, which operates in conjunction with the script execution section script execution section 802 to perform functions relating to information collection messages, such as judging whether the requisite number of response information sets have been successively obtained.

The operation of the script execution section script execution section 802 and information collection message generating section 806 of this embodiment are based on a script which is of the form shown in the examples of FIGS. 21 and 22. In the Message segment of this script, in the same way as for the second embodiment described above, the first six lines (text="ask(User,Me,Order)") to (tell(Me,Sender, Response)), of the script example of the first embodiment, have been abbreviated to simplify the diagram. The Rule segment of the script contains two "action" portions, which are executed in succession. The first of these is identical to that of the first embodiment, while the second "action" portion defines a processing sequence to be performed to decrement the count number ("Count"), with the resultant updated value being designed as NewCount. In addition, the Message segment includes two additional message format descriptors, i.e., "ask_all(User,Me,Count,Order)", which is the format of an information collection request message sent from a user as described above, and "ask_all(Sender,Me, Count,Order)", which is the format of an information collection message, sent from another agent.

Figure 23:
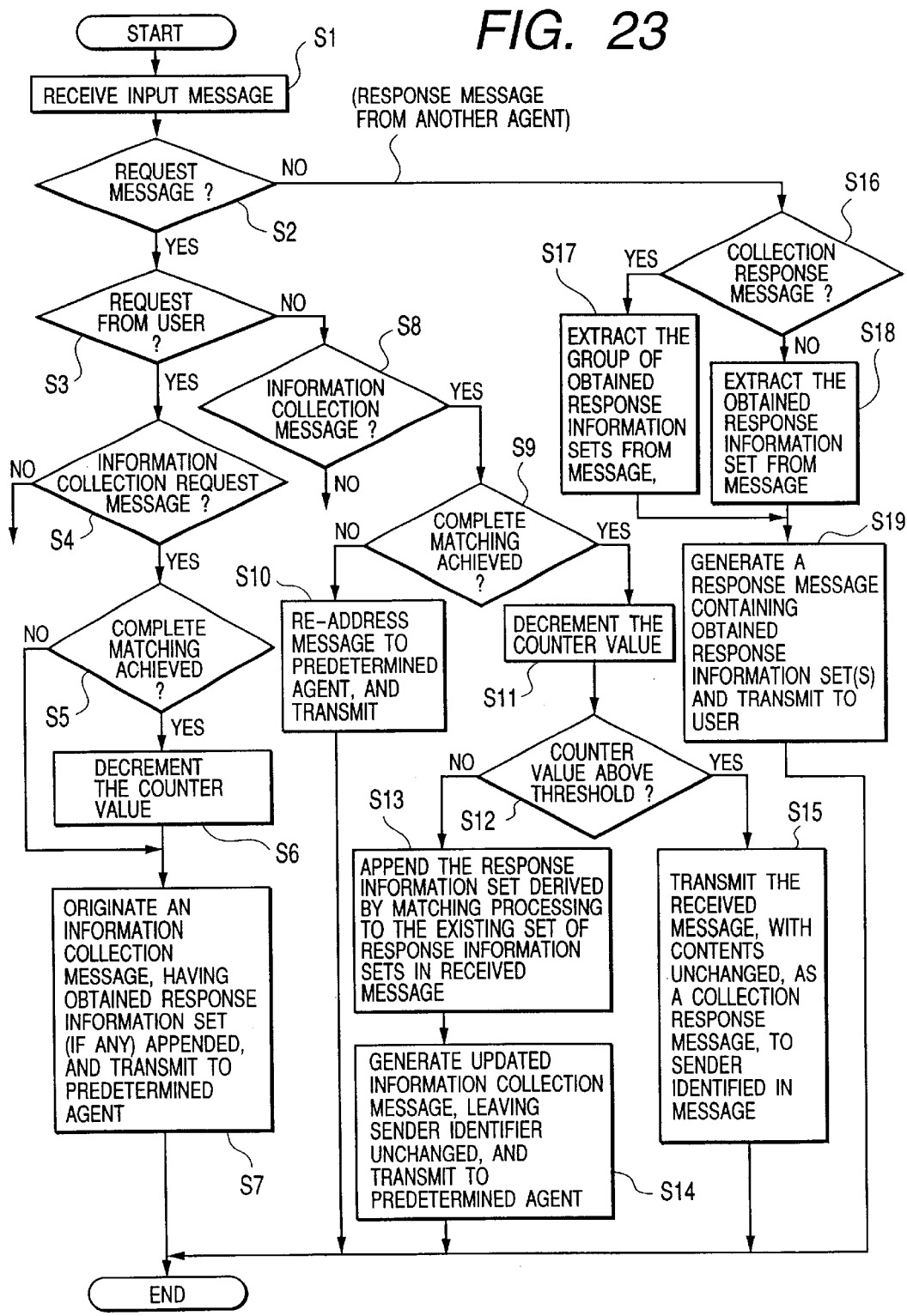
FIG. 23 is a flow diagram illustrating the overall flow of operations executed by an agent of the fourth embodiment, in response to messages relating to information collection.

Since the processing of a usual type of information request message from a user, and originating resultant propagation messages or handling received propagation messages, is identical to that described for the first embodiment, only the processing relating to information collection messages will be described in the following. FIG. 23 is a basic flow diagram illustrating the operation of an agent of this embodiment. To simplify the diagram, only the operations relating to information collection are shown. The operation will be described using the script examples of Figs, 21 and 22. Firstly, it will be assumed that user1 sends to agent1 an information collection request message for obtaining respective response information sets concerning the item videoA, from a total of two agents, as:

ask_all(user1,agent1,2,[I,want,videoA,info,_,_])

agent1 matches the message format against the contents of the Message segment of the script shown in FIG. 21, and finds that the message is of the format "ask_all(User,Me, Count,Order)". agent1 (after temporarily storing the identifier of the sending user, as described for the first embodiment) then executes the next line of the script, and so performs successive Rule and Knowledge matching processing as described for the first embodiment, to obtain the response information set "[price,is,_$25,_,_]". This point in the processing corresponds to completion of steps S2, S4, S5 in FIG. 23, with a YES decision for "complete matching" achieved The next "action" portion of the Message segment is then executed in which since a response information set ("Response") has been obtained, the value of Count is decremented by 1, i.e. NewCount takes the value 1 (step S6 in FIG. 23). In that case, the next portion of the script is executed to generate an information collection message to be sent to one propagation destination agent:

ask_all(Me,next1,NewCount,Order):[AppResponse]

In this case, the following message is thereby generated (step S7 in FIG. 23), in which the obtained response information set is inserted as the first of a series of successively appended response information sets, collectively designated as "AppResponse":

ask_all(agent1,agent2,1,
 [I,want,videoA,info,_,_]):[price,is,_$25,_,_]

In that way, an information collection message is generated by agent1, with the Count value set to 1, and with the response information set obtained by agent1 appended to the message, which is then transmitted to agent2, i.e. the propagation destination agent specified as "next1".

As indicated by steps S5. S6, S7 in FIG. 23, if complete matching were not achieved by agent1, then an information collection message would be generated with the Count value left unchanged, i.e.:

ask_all(agent1,agent2,2,[I,want,videoA,info,_,_]):[ ]

However with the script example of FIG. 21, the information collection message conveying the "price is $25" information as described above is generated by agent1, and transmitted to agent2. It is then found by agent2 (step S8) that the received message matches the format:

ask_all(Sender,Me,Count,Order):[AppResponse]

thereby indicating that this is an information collection message that has been sent by an agent. In that case, (step S9) agent2 executes Rule and Knowledge matching of the Order contents of the message, to obtain appends that to the previously obtained response information set, and (step S12) decrements the value of Count, to obtain the updated value NewCount.

With the script example of FIG. 22, since the count value at this stage reached the threshold value, agent2 will generate a response message (step S15 in FIG. 23) conveying all of the appended response information sets, to be sent back to the "Sender" identified in the information collection message, i.e., agent1, as:

tell_append(agent2,agent1,[
[price,is,_,$25,_,_],[price,is,_,$54,_,_9 ])

On receiving this message, agent1 successfuly matches this with the format descriptor: "tell_append(Sender,Me, AppResponse)",
and so (steps S16, S17, S19 in FIG. 23) generates a response message addressed to user1, conveying the final set of successively appended response information sets (AppResponse), as:

tell_append(agent1,user1,[
[price,is,_,$25,_,_],[price,is,_,$54,_,_]])

In FIG. 23, steps S5 and S9 each actually represent execution of the aforementioned sequence of Message, Rule and Knowledge segment matching processing applied to the received message, and a decision as to whether all of that matching has been successful and a response information set thereby obtained, as described for the first embodiment and shown as the combination of steps S3, S4 in FIG. 8.

In the above simple example it is assumed that similar types of information are collected concerning a specific query item. However the invention is not limited to this, and in principle various different types of information concerning a specific query item can be collected from various agents, by using the principles of the embodiment described above.

It will be apparent that with the basic configuration described above, it is necessary to ensure that the Count value will actually reach the threshold value, for successful operation. If for example it is estimated that a certain number of (or all of) the agents of the system hold information concerning the query item, then it can be ensured that the initial value of Count is made no greater than that number of agents.

Figure 24:
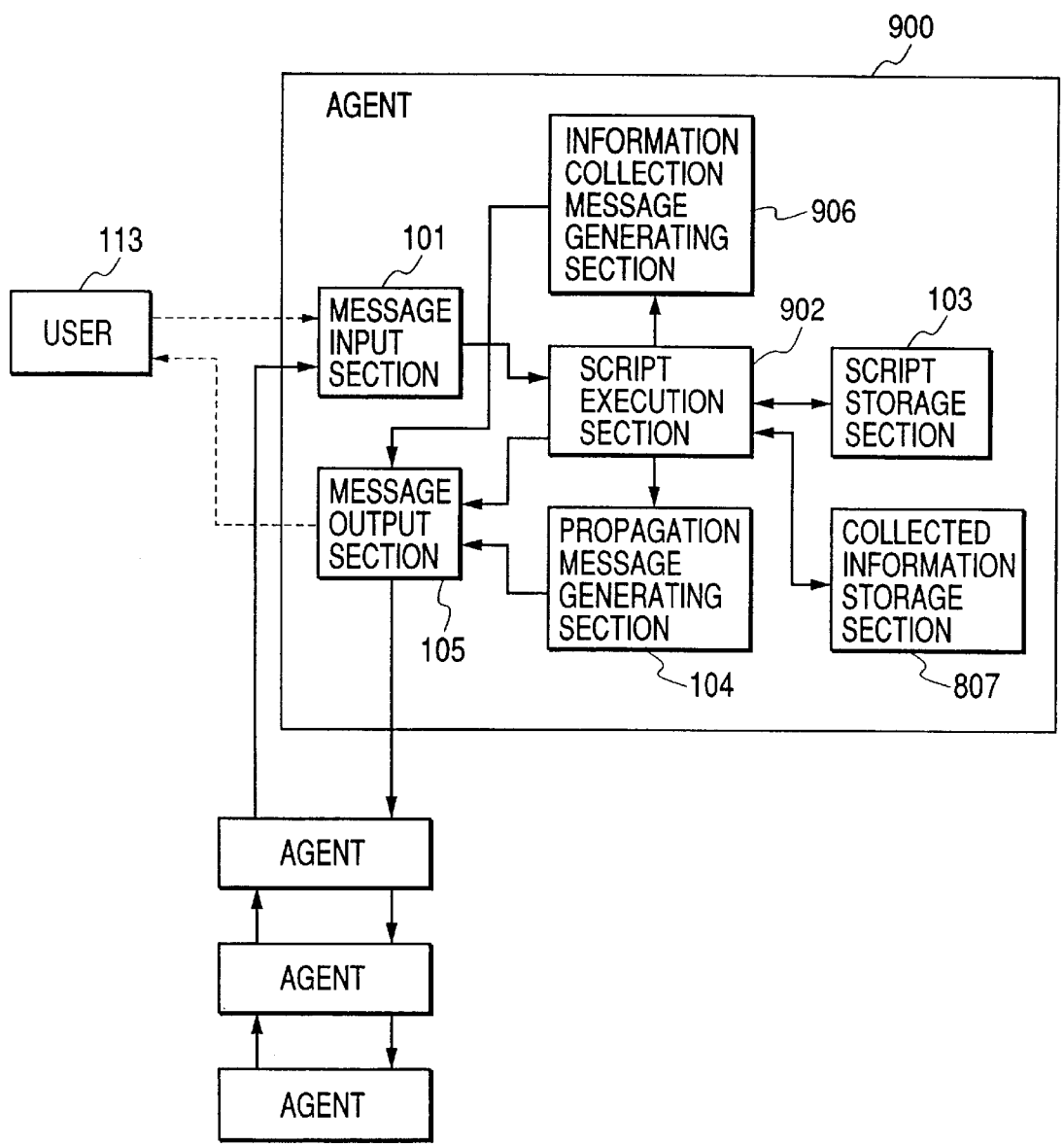
FIG. 24 is a general system block diagram of a fifth embodiment of a knowledge provider system, whereby an agent can initiate operations to collect respective response information sets, relating to a specific query item, from other agents of the system.

Furthermore although with the above embodiment it is assumed that an information collection message is always originated by an agent in response to a request message from a user, it would be equally possible to arrange that some or all of the agents of the system automatically (e.g. at regular periods) originates an information collection message, and stores the resultant group of response information sets in memory. In that case it could readily be arranged that a specific form of request message from a user will result in the collected information being sent to the user. This is illustrated by the general system block diagram of a fifth embodiment shown in FIG. 24. Here, the information collection message generating section 906 of an agent 906 automatically originates information collection messages (which can be of the form described hereinabove for the preceding embodiment), at times determined according to some predetermined criteria. A response message containing a group of appended response information sets is thereby obtained, and the response information sets are extracted and stored by the script execution section 902, in conjunction with the related message contents (Order) from the received message, in a collected information storage section 807, to be available to a user who sends an appropriate request message.

Figure 25:
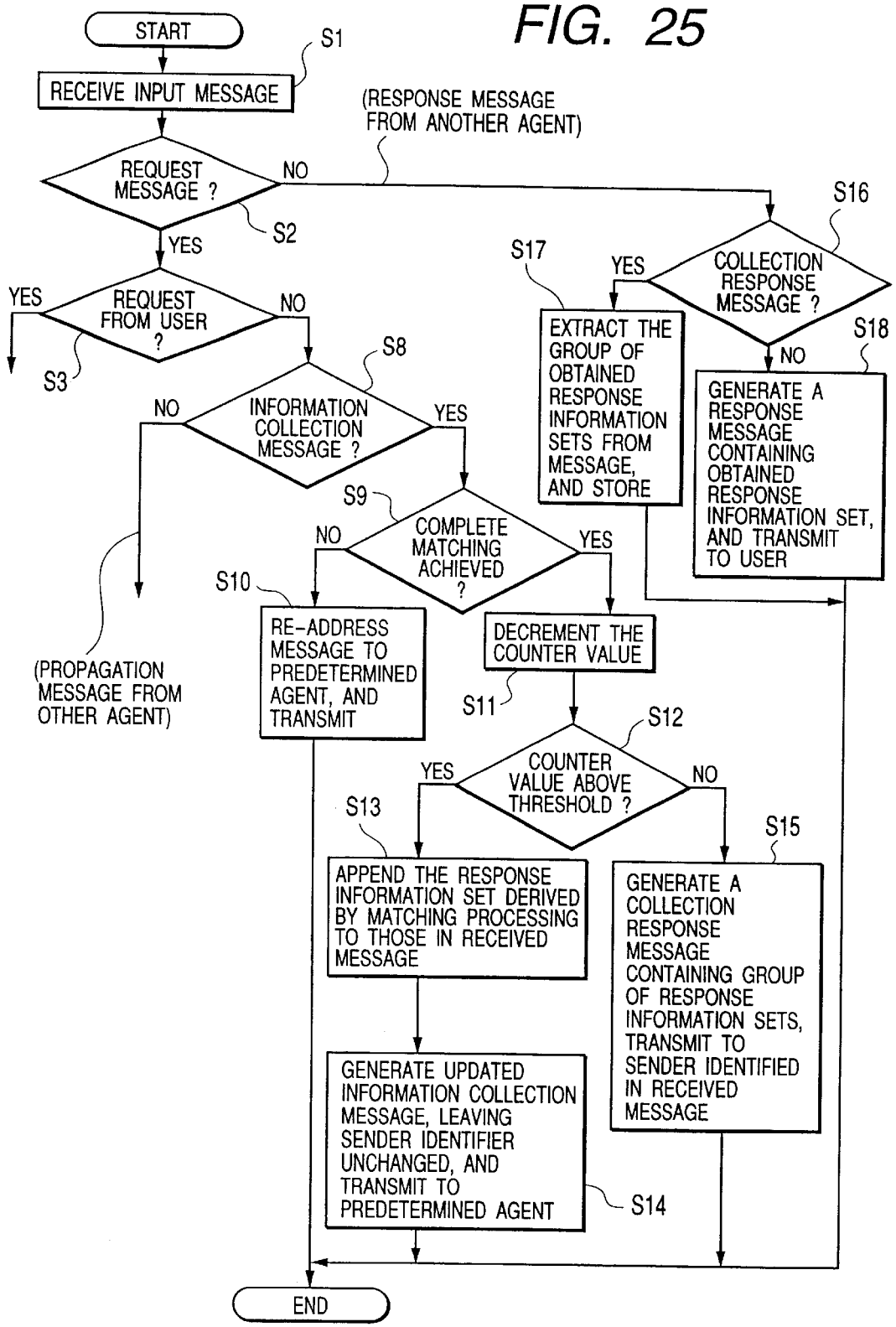
FIG. 25 is a flow diagram illustrating the overall flow of operations executed by an agent of the fifth embodiment, in response to messages relating to information collection.

FIG. 25 is a flow diagram showing the operations executed by an agent of this embodiment, in response to messages relating to information collection messages. Since it will be apparent that the operation of such an embodiment is basically similar to that of the preceding embodiment is basically similar to that of the preceding embodiment as illustrated in the flow diagram of FIG. 23, detailed description will be omitted.

Figure 26:
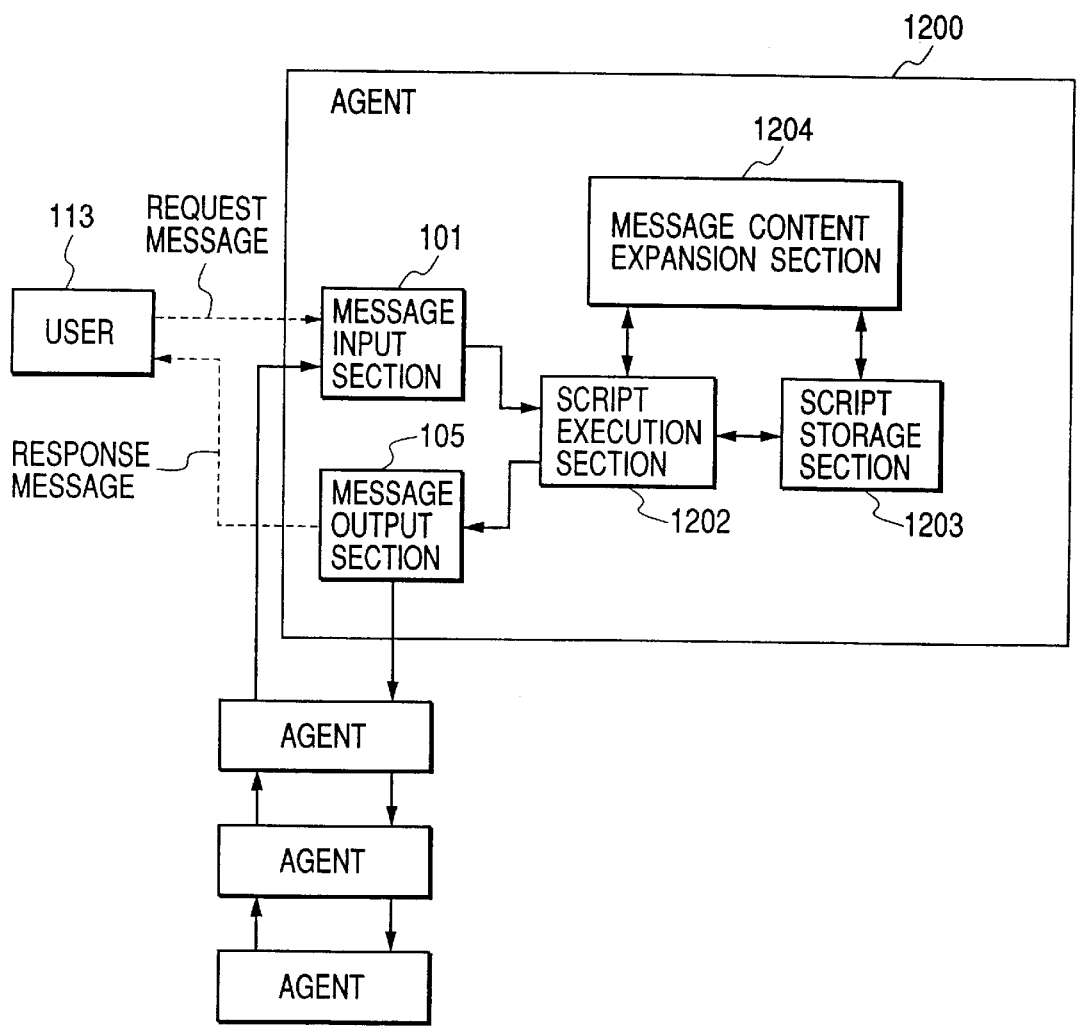
FIG. 26 is a general system block diagram of a sixth embodiment of a knowledge provider system according to the present invention, in which a content format descriptor used for matching against the contents of a received message can be expanded into a plurality of forms, by successive use of different alias character strings in the content descriptor.

With the embodiments described above, it is necessary for a user to generate information request messages which are in accordance with one specific set of rules, i.e., whereby specific words (such as "want", "information", etc.) must be inserted into respective specific fields of the content portion of a request message. In order to provide greater flexibility of use, it is desirable that a range of variation of the message generation rules, i.e. a plurality of permissible message formats be possible. A sixth embodiment of the invention will be described in the following, whereby such increased flexibility is achieved for generating a request message by a user or agent. This is achieved by adding, to each agent of the first embodiment described hereinabove, a feature referred to as a message content expansion section, whereby a number of alternative versions (i.e., aliases) are provided for each of one or more of the character strings which make up a user request message. FIG. 26 is a general system block diagram of such a system, in which each agent 1200 includes, in addition to a message input section 101, and script execution section 102, a message content expansion section 1204, with the script execution section 1202 and script storage section 1203 of such an agent being configured to operate in conjunction with the message content expansion section 1204 to provide the types of operation described in the following.

FIG. 27 is an example of the script held by an agent of a system according to this sixth embodiment. This differs from the script example of FIG. 3 of the first embodiment only in that:

(a) An Expansion segment, delimited by "expansion>" to "<expansion" is added, and (b) The "text=?1" portion of the Message segment begins with an additional line "test(expand(?1))" This signifies that if complete (Message, Rule, Knowledge) matching is not successful, for a request message received from a user, then before originating a propagation message, the aliases contained in the Expansion segment are to be successively inserted into predetermined fields of the content format descriptor in the Rule segment, with the matching processing being sequentially repeated using these aliases until complete matching successful is achieved or all of the aliases have been tried. In the example of FIG. 27, the Expansion segment contains respective sets of these aliases for use in the second, fourth and fifth fields of the content format descriptor of the Rule segment of the script. Thus by using the respective aliases for the second field, when executing Rule matching of the message contents, successful matching might be achieved for each of messages having a content portion which begins in any of the following ways: "I,want . . . ", "Please,tell . . . ", "Please,send, . . . ."

For simplicity of operation, the use of the aliases can be started whenever it is found that complete matching success with respect to the Message, Rule and Knowledge segments has not been achieved for a received request message. Alternatively, use of the aliases can be immediately started when it is found that Rule matching is not successful. A propagation message is generated only after Rule matching has been attempted using each of the aliases of the respective sets of aliases assigned to the various fields.

Figure 28:
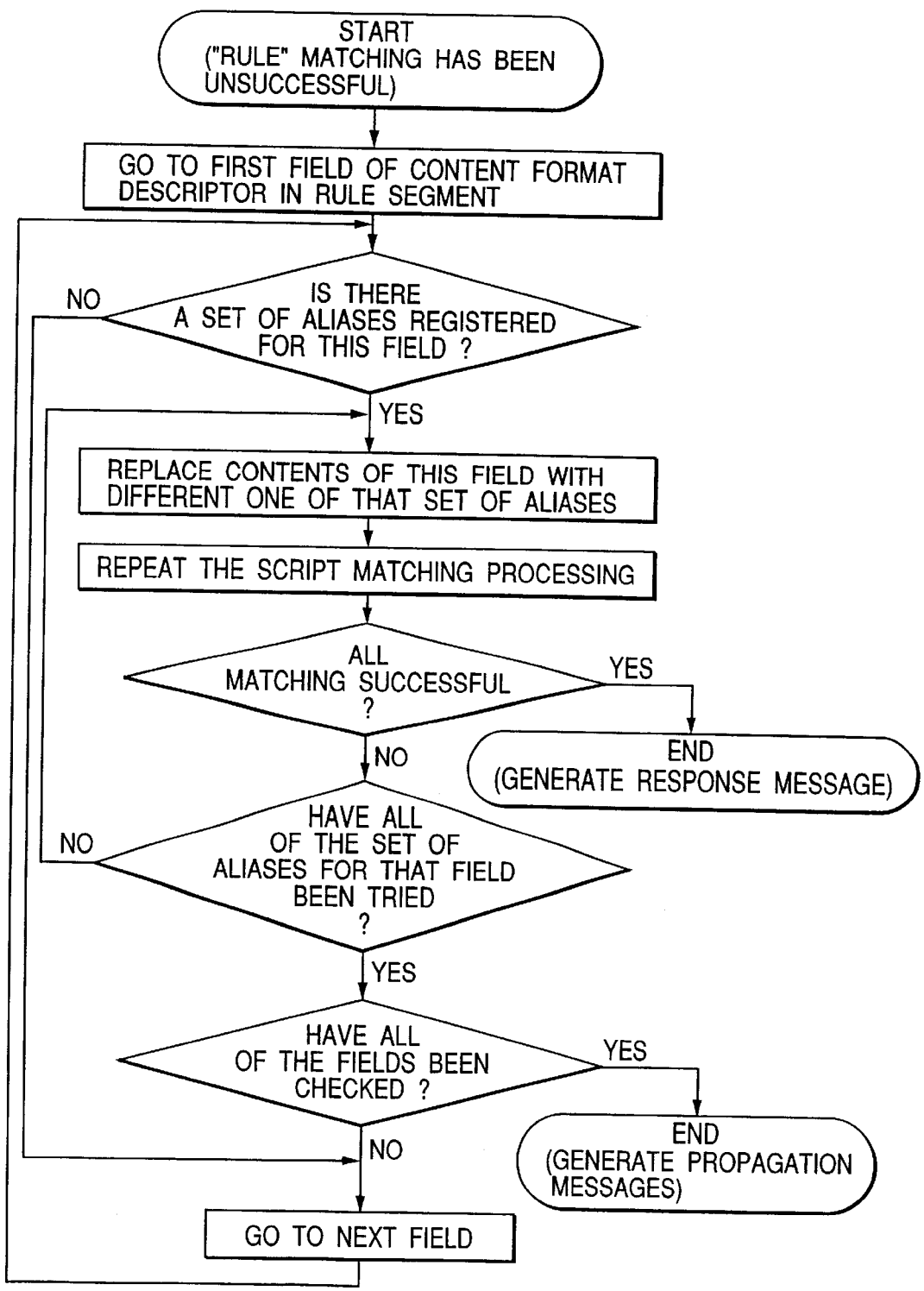
FIG. 28 is a flow diagram of an example of how successive matching operations using the contents of a received message are performed, by applying different combinations of alias character strings in the content format descriptor, with the sixth embodiment.

FIG. 28 is a flow diagram of the operating sequence in which the aliases of the message content expansion section are used, when an information request message has been received and matching success has not been achieved.

Taking the case of the script of FIG. 27, assuming that Rule matching of the content portion of the received message has failed, then a different one of the set of aliases that are predetermined as corresponding to the second field of the content format descriptor is inserted into that field, such as "send". In that case, the content format descriptor "[__,teach, Object,info,__,__]" of the Rule segment is changed to "[__, send,Object,info,__,__]", then the message content portion (Order) is matched against that Rule portion. If this matching is not successful, then "send" is changed to "want", and Rule matching of the message contents is again attempted. If Rule matching success (and then Knowledge matching success) is not achieved after trying all of the sets of aliases for all of the corresponding fields, then a propagation message is generated as described for the first embodiment.

In all other respects, the operation and configuration of this embodiment can be identical to that of the first embodiment of the invention.

Figure 29:
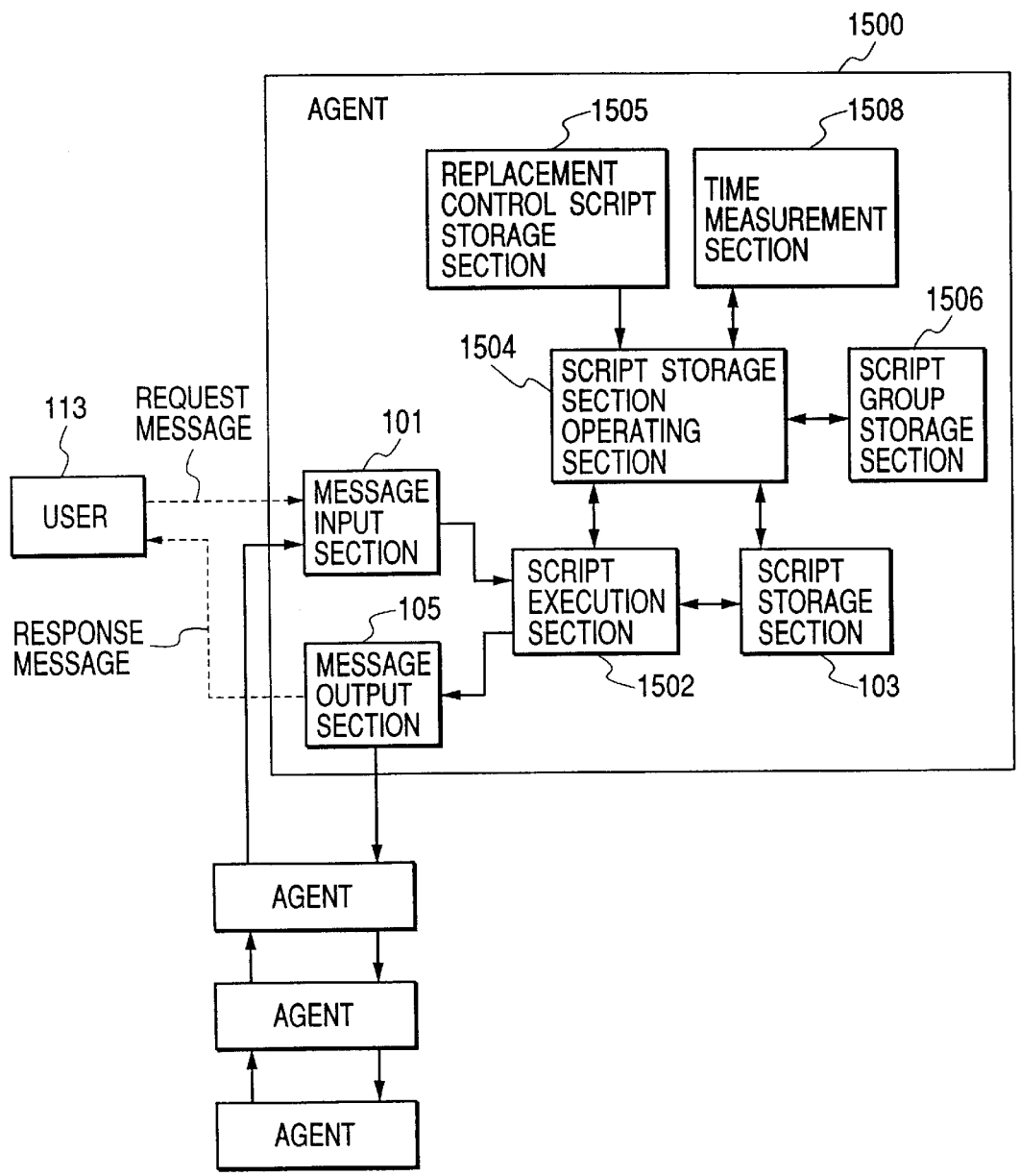
FIG. 29 is a general system block diagram of a seventh embodiment of a knowledge provider system according to the present invention, in which one of a plurality of scripts stored at an agent can be selected for use in processing a received message, in accordance with the contents of that message.

A seventh embodiment of the invention will be described in the following, referring first to the system block diagram of FIG. 29. This embodiment differs from the first embodiment in that each agent of the system further includes a script storage section operating section 1504, a replacement control script storage section 1505, a script group storage section 1506 and a time measurement section 1508. With this embodiment, when a user request message or a propagation message is received by an agent, then one of a plurality of different scripts may be selected to be read out from the script group storage section 1506 and stored in the script storage section 103, for use by the script execution section 102. That selection is performed based on the results of matching the content portion of the received against a special type of script referred to as the replacement control script, which is held in the replacement control script storage section 1505. In that way, it becomes possible for an agent to to automatically select a script which is appropriate for handling a particular type of information request, thereby enabling more efficient processing to be achieved.

FIG. 30 shows an example of a replacement control script which might be stored in the replacement control script storage section 1505. This consists of two segments, the first of which is defined by the delimiters "load>" to "<load", and will be referred to as the Script Selection segment, and the second of which is defined by the delimiters "load__ relation>" to "<load__relation", and will be referred to as the Related Script segment.

The Script Selection segment consists of a set of message content format descriptors which will be referred to as the selection format descriptors, such as "[__,__,sports,__,__,__]". Each of these selection format descriptors is linked to a specific script that is stored in the script group storage section 1506, e.g. with the "[__,__,sports,__,__,__]" selection format descriptor being linked to the "sports.agentscript" script, which is a script containing items of sports-related information in its Knowledge segment. It will be assumed, for simplicity of description, that only the five scripts shown in FIG. 30, having the "agentscript" suffix, are held in the 1506. In the "[__,__,__,__,Where,__]" selection format descriptor, "Where" represents a place name (such as the name of a city) which may be contained in a received message, and is linked to a script which contains information relating to that place, or to a set of places including the specified place.

Figure 31B:
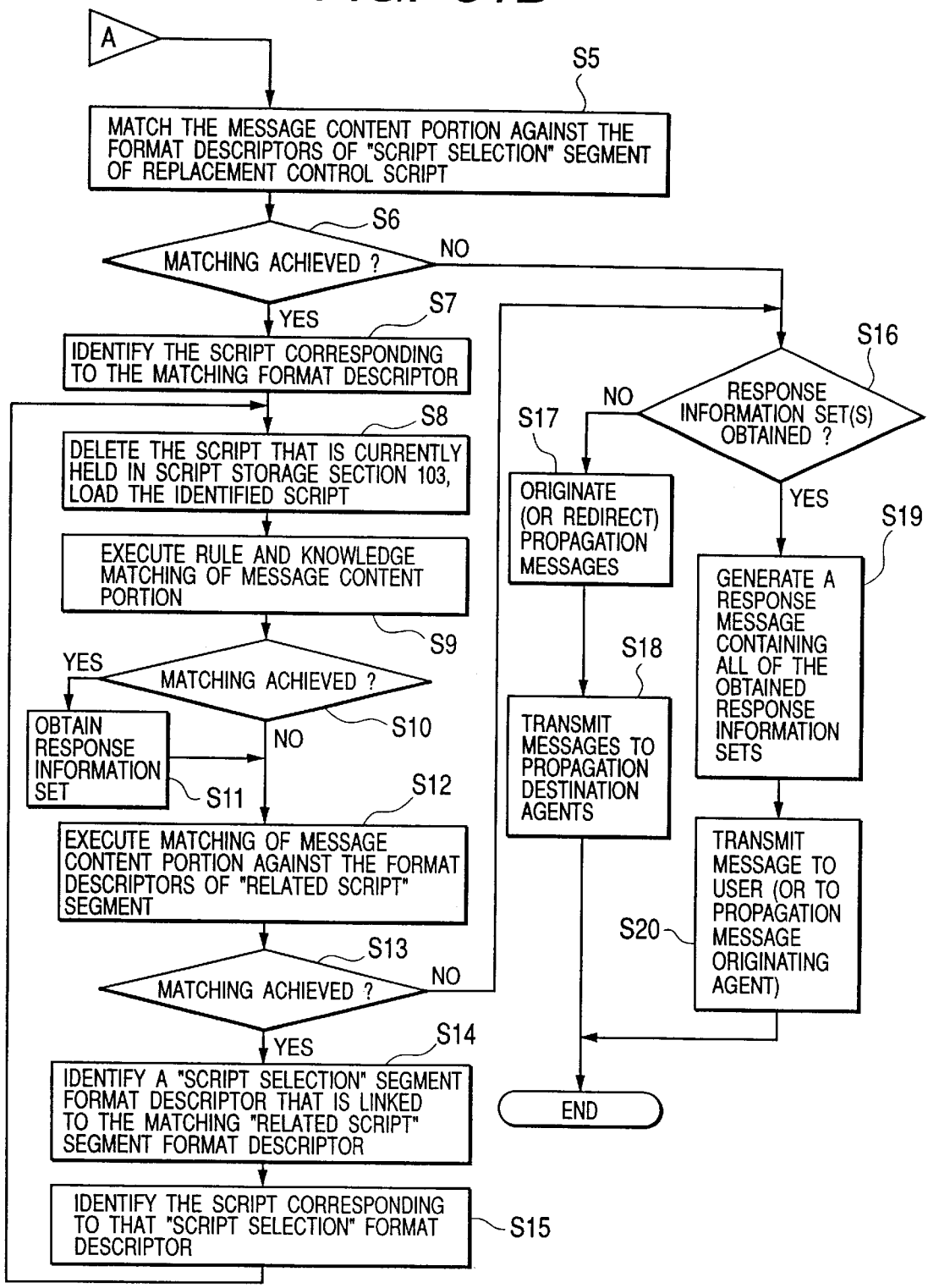

The Related Script segment similarly contains a set of content format descriptors. However each of these is linked, as indicated by the ">>" symbol, to one or more of the selection format descriptors of the Script Selection segment. Thus for example the content format descriptor "[__,__, news,__,__,__]" of the Related Script segment is linked to each of the format descriptors "[__,__,sports,__,__,__]" and "[__,__,weather,__,__,__]" of the Script Selection segment. FIGS. 31A, 31B constitute a flow diagram illustrating the basic operation sequence which is executed by an agent of this embodiment, when a user request message or a propagation message is received (i.e., when there is a "Yes" decision in step S2). In that case, if all of the Message, Rule and Knowledge matching of the received message against the script current held in the storage section 103 is successful, a response information set is obtained (step S3B), as described for the first embodiment. However with this embodiment, any information set which is obtained at that point is temporarily stored, and the processing sequence shown in FIG. 31B is then executed.

It will be assumed for the purpose of description that a request message having the content portion "[__,__, news,__,__,__]" is received by the agent, such as "[I,want, news,info,__,__]". Assuming that the script which is currently held in the script storage section 103 does not contain the necessary news-related information in its Knowledge segment, then when matching processing is executed (in the sequence Message, Rule, Knowledge) as described for the first embodiment (step S2 in FIG. 31A), no information will be obtained, and operation proceeds to step S5 in FIG. 31B. This is executed by the script storage section operating section 1504, using the contents of the replacement control script storage section 1505, and consists of matching the message contents against the Script Selection segment of the replacement control script shown in FIG. 30. Matching will be successful for the "[__,__,news,__,__,__]" format descriptor of the Script Selection segment, and in that case the corresponding script (i.e. the stored script which is indicated in the Script Selection segment as being linked to that format descriptor), "news.agentscript" is identified (steps S5, S6, S7 in FIG. 31B). The identified script is then read out from the script group storage section 1506 by the script storage section operating section 1504 and loaded into the script storage section 103, while the script which is currently held therein is deleted (step S8). Matching of the received message against the the script held in the script storage section 103 is then executed, as described for the first embodiment. A response information set such as a news report will then be obtained (steps S10, S11).

Although not shown in the drawings, the script group storage section 1506 is connected to an external data source, from which information is periodically provided for updating the contents of the Knowledge segment of the "news-.agentscript" script. The "news.agentscript" script name has the appended designation "60 sec". This indicates that the script is to be held in the script storage section 103 for 60 seconds, after having been loaded therein by the script storage section operating section 1504, and then to be deleted. That operation is controlled by the time measurement section 1506, in conjunction with the script storage operating section 1504. The embodiment thereby enables it to be ensured that only up-to-date news information will be contained in the Knowledge segment of the "news.agentscript" that is currently held in the script storage section 103.

On completion of the above steps (S6, S7, S8), the message content portion is then matched against the contents of the Related Script segment of the replacement control script. With the message content portion "[I,want,news,info,_,_]", there is a corresponding format descriptor "[_,_news,_,_,_]"in that Related Script segment, which links to the format descriptor "[_,_,sports,_,_,_]" of the Script Selection segment. Thus in this case, matching of the message content portion "[I,want,news,info,_,_]" against the contents of the Related Script segment leads to the format "[_,_,sports,_,_,_]" of the Script Selection segment, which results in the corresponding stored script "sports.agentscript" being identified as the script which is to be loaded into the storage section 103. (steps S12, S13, S14, S15 in FIG. 31B). The preceding sequence of steps S8 to S11 is then repeated, to obtain an information set relating to sports. Step S12 is then again executed, to find if there is any other Script Selection format descriptor that is linked via a Related Script segment format descriptor to the message content portion "[I,want,news,info,_,_]". In this case, it is found that there is such an additional linked format descriptor, i.e. "[_,_,weather,_,_,_]". The corresponding script is then loaded, to obtain an additional response information set in step S11, (i.e., a weather forecast).

It is then determined, by again executing steps S12, S13, that no further Script Selection format descriptor is linked via a Related Script segment format descriptor to the message content portion "[I,want,news,info,_,_]", and so operation proceeds to step S16.

If no response information set had been obtained as a result of the processing described above, then the received message contents would be have been redirected to each of the propagation destination agents, as a set of propagation messages, as described for the first embodiment (steps S17, S18). However with the present example, a response message conveying each of the response information sets which have been obtained is generated and sent to the requesting user (steps 19, 20). The response message is sent either directly or indirectly to the user, depending upon whether the request message contents "[I,want,news,info,_,_]" was conveyed in a message sent directly from the user, or was sent in a propagation message from another agent, as described for the first embodiment.

Furthermore if it can be expected that user request messages will originate from a specific district, then it becomes possible for an agent to automatically select a script which is oriented to that particular district. For example with the replacement control script example of FIG. 30, when the message contents concern the weather (such as "[I,want,weather,info,_,_]"), then after a response information set consisting of a general weather report has been obtained by loading and using the "weather.agentscript" script, it will be found that the message content portion leads, via the Related Script segment, to the "[_,_,_,_,Where,_]" format descriptor. In that case if the system assumes a specific value such as "Boston" for the variable "Where", based on some predetermined criterion (i.e., some basis for assuming that the received message originated from a specific place) then operation will proceed as if the received message contents matched the format "[_,_,weather,_,Boston,_]" format. If a script for providing weather information for the Boston area which has been stored beforehand in the script group storage section 1506, linked to the selection format descriptor "[_,_,weather,_,Boston,_]", then that script would be loaded into the script storage section 103 when step S8 of FIG. 31B is then executed. In that way, a user could be automatically provided with detailed local weather information.

It can thus be understood from the above description of embodiments that the present invention enables a knowledge provider system to be implemented which has great flexibility of use, from a variety of aspects, and in particular which eliminates the need for any form of centralized control of the overall system.

Although the invention has been described based on separate embodiments, it will be understood that various features of these different embodiments could be advantageously combined into a single knowledge provider system. It should further be understood that the scope claimed for the invention is not limited to the described embodiments, and that various modifications to the embodiments could be readily envisaged. In particular, various other script configurations could be envisaged which would enable the described "Message, Rule, Knowledge" sequence of matching operations to be performed.

What is claimed is:

1. An agent knowledge provider system comprising a plurality of knowledge provider agents and plurality of user apparatuses respectively interconnected for exchange of messages via a data communication network, with each of said messages including at least a sender identifier, a destination identifier, and a content portion, each of said knowledge provider agents comprising:

script storage means having stored therein a script containing message processing information comprising a knowledge segment containing at least one knowledge combination formed of a query item and a response information set corresponding to said query item, and a rule segment containing a content format descriptor which corresponds to a predetermined format of an information request message and which indicates a position of a query item within said format, and script execution and message handling means for judging that a message received via said network is an information request message, when an information request message is received, reading out said script from said storage means, executing a first pattern matching operation of comparing a content portion of said message with said content format descriptor, and when said content portion is found to match said content format descriptor, extracting said query item from a section of said content portion that is indicated by said content format descriptor, executing a second pattern matching operation of comparing said extracted query item with said knowledge segment contents, and when matching success is achieved, obtaining from said knowledge segment a response information set corresponding to said extracted query item, generating a response message having said response information set as the content portion thereof and transmitting said response message via said network to a sender of said information request message, while when at least one of said pattern matching operations is not successful, transmitting an information request message containing said content portion to at least one predetermined other knowledge provider agent.

2. An agent knowledge provider system comprising a plurality of knowledge provider agents and plurality of user apparatuses respectively interconnected for exchange of messages via a data communication network, with each of said messages including at least a sender identifier, a destination identifier, and a content portion, each of said knowledge provider agents comprising:

script storage means (103) having stored therein a script containing message processing information and respective identifiers of a plurality of knowledge provider agents which have been assigned as respective propagation destination agents of said agent, said message processing information comprising a message segment, a rule segment and a knowledge segment, said message segment containing a plurality of message format descriptors respectively corresponding to a format of a user request message that is received from a user apparatus, to a format of a propagation message that is received from another one of said agents, and to a format of a response message which is received from another one of said agents, said rule segment containing at least one "action" portion having a content format descriptor which expresses a predetermined format of an information request message and indicates a position of a query item within said format, and said knowledge segment containing at least one knowledge combination formed of a query item and a response information set corresponding to said query item, and script execution and message handling means (101, 102, 103, 104) for obtaining said script from said script storage means when a message is received via said network by said agent, and executing a first pattern matching operation of comparing said received message with the contents of said message segment, when said received message is found to match one of said user request message format descriptor and propagation message format descriptor, executing a second pattern matching operation of comparing said content portion of said message with the contents of said rule segment, and when said received message content portion is found to match said content format descriptor, extracting a query item from a section of said message content portion that is indicated by said content format descriptor, and executing a third pattern matching operation of comparing said extracted query item with the contents of said knowledge segment to thereby obtain a response information set corresponding to said received message, and when matching success is achieved for each of said first, second and third pattern matching operations, generating a response message having said response information set as the content portion thereof and having the sender identifier of said received request message as the destination identifier thereof, and transmitting said response message via said network, when said received message is found to match said user request message format descriptor and at least one of said pattern matching operations is not successful, registering the identifier of the user apparatus that is the sender of said message, originating a plurality of propagation messages having said identifiers of said propagation destination agents as respective destination identifiers thereof, with each propagation message having said received message content portion as the content portion thereof and having the identifier of said each knowledge provider agent as the sender identifier thereof, and transmitting said propagation messages via said network, when said received message is found to match said propagation message format descriptor and at least one of said pattern matching operations is not successful, redirecting said propagation message to each of said propagation destination agents, with said sender identifier of the received message left unchanged, and transmitting the resultant propagation messages via said network, and when said received message is found to match said response message format descriptor, obtaining a previously registered identifier of a user apparatus, generating a response message having the content portion of said received message as the content portion thereof and said user apparatus identifier as the destination identifier thereof, and transmitting said response message via said network.

3. The agent knowledge provider system according to claim 2, wherein at least one of said user apparatuses is operable for sending to a knowledge provider agent a processing information acquisition request message for commanding said knowledge provider agent to acquire processing information relating to a specific message content portion from the script of another one of said knowledge provider agents, wherein each knowledge provider agent further comprises script combining means (506) coupled to said script storage means (103), wherein said message segment further includes a format descriptor for a processing information acquisition request message, a format descriptor for a processing information acquisition message, and a format descriptor for a processing information response message, and wherein said script execution and message handling means further comprises means for, when a received message is found to match said processing information acquisition request message format descriptor, generating a plurality of processing information acquisition messages having respective identifiers of said propagation destination agents as the destination identifiers thereof, each having the content portion of said received message as the content portion thereof, and transmitting said messages via said network, when a received message is found to match said processing information acquisition message format descriptor, executing at least one of said second and third pattern matching operations, as predetermined for said processing information acquisition message format descriptor, and when each of said pattern matching operations have been successful, extracting from said script a part of said processing information, as predetermined for said processing information acquisition message format descriptor, generating a processing information response message having said extracted processing information as the content portion thereof and having the sender identifier of said received message as the destination identifier thereof, and transmitting said response message via said network, when a received message is found to match said processing information response message format descriptor, extracting said content portion of said received message and supplying said content portion to said script combining means, to be combined with said processing information of said script.

4. The agent knowledge provider system according to claim 2, wherein at least one of said user apparatuses is operable for sending to a knowledge provider agent a processing information acquisition request message for commanding said agent to acquire an "action" portion relating to a specific message content portion from the script of another one of said agents, wherein each knowledge provider agent further comprises script combining means (506) coupled to said script storage means (103), wherein said message segment further includes a format descriptor for an "action" portion acquisition request message, a format descriptor for an "action" portion acquisition message, and a format descriptor for an "action" portion acquisition response message, and wherein said script execution and message handling means further comprises means for, when a received message is found to match said "action" portion acquisition request message format descriptor of the script held by said each agent, generating a plurality of "action" portion acquisition messages having respective identifiers of said propagation destination agents as the destination identifiers thereof, each having the content portion of said received message as the content portion thereof, and each having the identifier of said each knowledge provider agent as the sender identifier thereof, and transmitting said "action" portion acquisition messages via said network, when a received message is found to match said "action" portion acquisition message format descriptor of said script, executing said second pattern matching operation, and when pattern matching of said received message content portion against an "action" portion of said test segment of the script is successful, generating an "action" portion response message having said "action" portion as the content portion thereof and having the sender identifier of said received message as the destination identifier thereof, and transmitting said response message via said network, when a received message is found to match said "action" portion acquisition response message format descriptor of said script, extracting said "action" portion from the content portion of said received message and supplying said "action" portion to said script combining means, to be combined with the existing contents of said rule segment of said script.

5. The agent knowledge provider system according to claim 2, wherein at least one of said user apparatuses is operable for sending to a knowledge provider agent a knowledge combination acquisition request message for commanding said knowledge provider agent to acquire a knowledge combination relating to a specific message content portion from the script of another one of said agents, wherein each knowledge provider agent further comprises script combining means (506) coupled to said script storage means (103), wherein said message segment further includes a format descriptor for a knowledge combination acquisition request message, a format descriptor for a knowledge combination acquisition message, and a format descriptor for a knowledge combination response message, and wherein said script execution and message handling means further comprises means for, when a received message is found to match said knowledge combination acquisition request message format descriptor, generating a plurality of knowledge combination acquisition messages having respective identifiers of said propagation destination agents as the destination identifiers thereof, each having the content portion of said received message as the content portion thereof, and each having the identifier of said each knowledge provider agent as the sender identifier thereof, and transmitting said knowledge combination acquisition messages via said network, when a received message is found to match said knowledge combination acquisition message format descriptor, executing said second and third pattern matching operations, and when each of said second and third pattern matching operations is successful, so that a combination of a query item and response information set which matches said received message is obtained from said knowledge segment, generating a knowledge combination response message having said combination of query item and response information set as the content portion thereof and having the sender identifier of said received message as the destination identifier thereof, and transmitting said response message via said network, and when a received message is found to match said knowledge combination response message format descriptor, extracting said knowledge combination from said received message and supplying said knowledge combination to said script combining means, to be combined with the existing contents of said Knowledge segment of said script.

6. The agent knowledge provider system according to claim 2, wherein each of said knowledge provider agents further comprises processing information acquisition message generating means (507) responsive to origination of a propagation message by said knowledge provider agent for generating a plurality of processing information acquisition messages having as respective destination identifiers said identifiers of said propagation destination agents, each of said processing information acquisition messages having the content portion of said propagation message as the content portion thereof, each of said agents further comprising script combining means (506) coupled to said script storage means (103), wherein said message segment further includes a format descriptor for a processing information acquisition message, and a format descriptor for a processing information response message, and wherein said script execution and message handling means further comprises means for, when a received message is found to match said processing information acquisition message format descriptor, executing at least one of said second and third pattern matching operations, as predetermined for said processing information acquisition message format descriptor, and when each of said pattern matching operations have been successful, extracting a part of said processing information, as predetermined for said processing information acquisition message format descriptor, generating a processing information response message having said extracted processing information as the content portion thereof and having the sender identifier of said received message as the destination identifier thereof, and transmitting said response message via said network, when a received message is found to match said processing information response message format descriptor, extracting said specific processing information from said received message and supplying said specific processing information to said script combining means, to be combined with said processing information of said script.

7. The agent knowledge provider system according to claim 2, wherein each of said knowledge provider agents further comprises processing information acquisition message generating means (507) responsive to origination of a propagation message by said agent for generating a plurality of "action" portion acquisition messages having as respective destination identifiers said identifiers of said propagation destination agents, each of said "action" portion acquisition messages having the content portion of said propagation message as the content portion thereof, each of said knowledge provider agents further comprising script combining means (506) coupled to said script storage means (103), wherein said message segment further includes a format descriptor for an "action" portion acquisition message, and a format descriptor for an "action" portion acquisition response message, and wherein said script execution and message handling means further comprises means for when a received message is found to match said "action" portion acquisition message format descriptor, executing said second pattern matching operation, and when pattern matching of said received message content portion against an "action" portion of said script is successful, generating an "action" portion acquisition response message having said "action" portion of said script as the content portion thereof and having the sender identifier of said received message as the destination identifier thereof, and transmitting said response message via said network, and when a received message is found to match said "action" portion acquisition response message format descriptor, extracting said "action" portion from the content portion of said received message and supplying said "action" portion to said script combining means, to be combined with the existing contents of said rule segment of said script.

8. The agent knowledge provider system according to claim 2, wherein each of said knowledge provider agents further comprises processing information acquisition message generating means (507) responsive to origination of a propagation message by said knowledge provider agent for generating a plurality of knowledge combination acquisition messages having as respective destination identifiers said identifiers of said propagation destination agents, each of said knowledge combination acquisition messages having the content portion of said propagation message as the content portion thereof, wherein each of said knowledge provider agents further comprises script combining means (506) coupled to said script storage means (103), wherein said message segment of said script held by said agent further includes a format descriptor for a knowledge combination acquisition message, and a format descriptor for a knowledge combination response message, and wherein said script execution and message handling means further comprises means for, when a received message is found to match said knowledge combination acquisition message format descriptor, executing said second and third pattern matching operations, and when each of said second and third pattern matching operations is successful, so that a knowledge combination formed of a query item and response information set which matches said received message is obtained from said knowledge segment, generating a knowledge combination response message having said knowledge combination set as the content portion thereof and having the sender identifier of said received message as the destination identifier thereof, and transmitting said response message via said network, and when a received message is found to match said knowledge combination response message format descriptor, extracting said knowledge combination from said received message and supplying said knowledge combination to said script combining means, to be combined with the existing contents of said knowledge segment of said script.

9. The agent knowledge provider system according to claim 2, wherein each of said knowledge provider agents further comprises collected information storage means (807) and information collection message generating means (906) for originating an information collection message to obtain from a predetermined number of said agents respective response information sets relating to a specific message content portion, at times determined by predetermined criteria, said information collection message being formed of said specific content portion, and a count number which differs from a threshold value by said predetermined number, and having the identifier of a predetermined one of said propagation destination agents as the destination identifier thereof, wherein said message segment of said script further includes a format descriptor for an information collection message, and a format descriptor for an information collection response message, and wherein said script execution and message handling means of said each knowledge provider agent further comprise means for, when said received message is found to match said information collection message format descriptor, applying said second and third pattern matching operations to said content portion of said received message, and when matching success is achieved for both of said second and pattern matching operations and a response information set thereby obtained, decrementing said count number by a predetermined amount to obtain an updated count number, and when said updated count number is higher than said threshold value, generating an updated information collection message having as its content portion the content portion of said received message, with said obtained response information set and any previously obtained response information set (s) from said received message appended thereto, having the sender identifier of said received message as the sender identifier thereof, and having the identifier of said predetermined propagation destination agent as the destination identifier thereof, and transmitting said updated information collection message via said network, while when said updated count value is not higher than said threshold value, generating an information collection response message having the sender identifier of the received message as the destination identifier thereof, and having as the content portion thereof said obtained response information set together with any response information sets contained in said received message, and transmitting said information collection response message via said network, while, when matching success is not achieved for both of said second and third pattern matching operations, changing the destination identifier of said received message to that of said predetermined propagation destination agent, and transmitting the resultant message via said network, and when said received message is found to match said information collection response message format descriptor, extracting said response information sets constituting the content portion of said received message, and storing said response information sets in said collected information storage means (807).

10. The agent knowledge provider system according to claim 2, wherein at least one of said user apparatuses is operable for sending to a knowledge provider agent an information collection request message for commanding said knowledge provider agent to acquire respective response information sets each relating to a specific message content portion, from a predetermined number of said knowledge provider agents, and to transmit said response information sets to said user apparatus, said information collection request message being formed of the identifier of said user apparatus as the sender identifier thereof, the identifier of a recipient knowledge provider agent as the destination identifier thereof, a count number which differs from a threshold value by said predetermined number, and said specific content portion, wherein each of said knowledge provider agents further comprises information collection message generating means (806) for generating an information collection message, wherein said message segment of said script further includes a format descriptor for an information collection request message, a format descriptor for an information collection message, and a format descriptor for an information collection response message, and wherein said script execution and message handling means of said each knowledge provider agent further comprise means for, when said received message is found to match said information collection request message format descriptor, registering the sender identifier from said message, applying said second and third pattern matching operations to said content portion of said received message, and when matching success is achieved for both of said second and third pattern matching operations and a response information set thereby obtained, decrementing said count number by a predetermined amount to obtain an updated value, generating an information collection message having said the identifier of said each knowledge provider agent as the sender identifier thereof, the identifier of a predetermined one of said propagation destination agents as the destination identifier thereof, containing said updated count number, and having the content portion of said received message as the content portion thereof, with said obtained response information set appended to said content portion, and transmitting said information collection message via said network, while, when matching success is not achieved for both of said second and third pattern matching operations, generating an information collection message having the identifier of said predetermined propagation destination agent as the destination identifier thereof, containing said count number of said information collection request message, and having the content portion of said received message as the content portion thereof, and transmitting said information collection message via said network, when said received message is found to match said information collection message format descriptor, applying said second and third pattern matching operations to said content portion of said received message, and when matching success is achieved for both of said second and third pattern matching operations and a response information set thereby obtained, decrementing said count number by said predetermined amount to obtain an updated count value, and when said updated count value is higher than said threshold value, generating an updated information collection message having the content portion of said received message as the content portion thereof, with said obtained response information set and any previously obtained response information sets appended to said content portion, having the sender identifier of said received message as the sender identifier thereof, and the identifier of said predetermined one of the propagation destination agents as the destination identifier thereof, and transmitting said updated information collection message via said network, while, when said updated count value is not higher than said threshold value, generating an information collection response message having the sender identifier of the received message as the destination identifier thereof, and having as the content portion thereof said obtained response information set together with any response information sets contained in said received message, and transmitting said information collection response message via said network, while, when matching success is not achieved for both of said second and third pattern matching operations, changing the destination identifier of said received message to that of said predetermined propagation destination agent, and transmitting the resultant message via said network, and, when said received message is found to match said information collection response message format descriptor, generating a response message having said response information sets constituting the content portion of said received message as the content portion thereof and having said registered user identifier as the destination identifier thereof, and transmitting said response message via said network.

11. The agent knowledge provider system according to claim 2, wherein said message content portion is configured with a plurality of data fields, wherein said content format descriptor of said rule segment defines respective character strings as occupying specific ones of said data fields, wherein each said character string defined for a data field is one of a set of alias character strings which have been predetermined as corresponding to said data field, wherein said each knowledge provider agent further comprises message content expansion means (1204) for storing said sets of alias character strings, and wherein said script execution and message handling means further comprises means for repetitively executing operations of, when said second pattern matching operation is not successful, reading out one of said alias character strings for one of said data fields, from said message content expansion means, replacing a character string which is currently defined for said field in said content format descriptor by said alias character string which is read out, and re-executing said second pattern matching operation.

12. The agent knowledge provider system according to claim 2, wherein said each knowledge provider agent further comprises script group storage means (1506) for storing a plurality of respectively different scripts each having a knowledge segment, rule segment, message segment and identifiers of assigned propagation destination agents, replacement control script storage means (1505) for storing a replacement control script having a script selection segment formed of a plurality of content format descriptors each predetermined as corresponding to one of said plurality of scripts held in said script group storage means (1506) and having a related script segment formed of at least one content format descriptor, with each of said content format descriptors of the related script segment being linked to at least one of said content format descriptors of the script selection segment, and script storage section control means (1504) coupled to each of said script storage means (103), script group storage means (1506) and replacement control script storage means (1505), functioning in conjunction with said script execution and message handling means to control transfer of scripts between said script group storage means (1506) and script storage means (103), said script storage section control means (1504) in conjunction with said script execution means (1502) comprising means for when a received message has been found to match one of said user request message format descriptor and propagation message format descriptor and said second and third pattern matching operations have been executed, temporarily registering any response information set which is obtained as a result of said pattern matching operations, and executing a script selection operating sequence of pattern matching said content portion of said received message against the contents of said script selection segment of said replacement control script, when said content portion is found to match one of said content format descriptors of said script selection segment, deleting the script which is currently held in said script storage means (103), reading out from said script group storage means (1506) the one of said scripts which corresponds to said pattern matching content format descriptor of the script selection segment, and loading said script into said script storage means (103), and executing said second and third pattern matching operations of said message content portion against said script which has been loaded into said script storage means (103), and temporarily registering any response information set which is obtained as a result of said pattern matching operations, and pattern matching said content portion of said received message;

pattern matching said message content portion against the contents of said related script segment of said replacement control script, when said content portion is found to match one of said content format descriptors of said related script segment, identifying a format descriptor of said script selection segment which is lined to said pattern matching format descriptor of the related script segment, identifying a script corresponding to said identified format descriptor, loading said identified script into said script storage means, executing said second and third pattern matching operations of said message content content portion against said script which has been loaded into said script storage means, and temporarily registering any response information set which is obtained thereby, and generating a response message having the sender identifier of said received message as the destination identifier thereof and having all of said obtained response information sets as the content portion thereof, and transmitting said response message via said network.

13. A method of knowledge providing, for application to a system comprising a plurality of knowledge provider agents and plurality of user apparatuses respectively interconnected for exchange of messages via a data communication network, with each of said messages including at least a sender identifier, a destination identifier, and a content portion, the method comprising, for each of said knowledge provider agents:

storing beforehend at said knowledge provider agent a script containing message processing information comprising a knowledge segment containing at least one knowledge combination formed of a query item and a response information set corresponding to said query item, and a rule segment containing at least one content format descriptor which corresponds to a predetermined format of an information request message and which indicates a position of a query item within said format, judging whether a message received via said network is an information request message, and when said received message is an information request message, reading out said script, executing a first pattern matching operation of comparing a content portion of said message with said content format descriptor, and when said content portion is found to match said content format descriptor, extracting said query item from a section of said content portion that is indicated by said content format descriptor, executing a second pattern matching operation of comparing said extracted query item with said knowledge segment contents, and when matching success is achieved, obtaining from said knowledge segment a response information set corresponding to said extracted query item, generating a response message having said response information set as the content portion thereof and transmitting said response message via said network to a sender of said information request message, while when at least one of said pattern matching operations is not successful, transmitting an information request message containing said content portion to at least one predetermined other knowledge provider agent.

14. A method of knowledge providing, for application to a system comprising a plurality of knowledge provider agents and plurality of user apparatuses respectively interconnected for exchange of messages via a data communication network, with each of said messages including at least a sender identifier, a destination identifier, and a content portion, the method comprising, for each of said knowledge provider agents:

storing beforehand at said agent a script containing message processing information and respective identifiers of a plurality of knowledge provider agents which have been assigned as respective propagation destination agents of said agent, said message processing information comprising a message segment, a rule segment and a knowledge segment, said message segment containing a plurality of message format descriptors respectively corresponding to a format of a user request message that is received from a user apparatus, to a format of a propagation message that is received from another one of said agents, and to a format of a response message which is received from another one of said agents, said rule segment containing at least one content format descriptor which corresponds to a predetermined format of an information request message and which indicates a position of a query item within said format, and said knowledge segment containing at least one knowledge combination formed of a query item and an information set which is linked to said query item, and controlling said each agent for obtaining said stored script when a message is received via said network by said agent, and executing a first pattern matching operation of comparing said received message with the contents of said message segment, when said received message is found to match one of said user request message format descriptor and propagation message format descriptor, executing a second pattern matching operation of comparing said content portion of said message with the contents of said rule segment, and when said received message content portion is found to match said content format descriptor, extracting a query item from a section of said message content portion that is indicated by said content format descriptor and executing a third pattern matching operation of comparing said extracted query item with said knowledge segment contents to thereby obtain a response information set corresponding to said received message, and when matching success is achieved for each of said first, second and third pattern matching operations, generating a response message having said response information set as the content portion thereof and having the sender identifier of said received request message as the destination identifier thereof, and transmitting said response message via said network, when said received message is found to match said user request message format descriptor and at least one of said pattern matching operations is not successful, registering the identifier of the user apparatus that is the sender of said message, originating a plurality of propagation messages having said identifiers of said propagation destination agents as respective destination identifiers thereof, with each propagation message having said received message content portion as the content portion thereof and having the identifier of said each knowledge provider agent as the sender identifier thereof, and transmitting said propagation messages via said network, when said received message is found to match said propagation message format descriptor and at least one of said pattern matching operations is not successful, redirecting said propagation message to each of said propagation destination agents, with said sender identifier of the received message left unchanged, and transmitting the resultant propagation messages via said network, and when said received message is found to match said response message format descriptor, obtaining a previously registered identifier of a user apparatus, generating a response message having the content portion of said received message as the content portion thereof and said user apparatus identifier as the destination identifier thereof, and transmitting said response message via said network.

15. The method according to claim 14, wherein at least one of said user apparatuses is operable for sending to a knowledge provider agent a processing information acquisition request message for commanding said knowledge provider agent to acquire specific processing information from the script of another one of said knowledge provider agents, the method further comprising inserting into said message segment of said script a format descriptor for a processing information acquisition request message, a format descriptor for a processing information acquisition message, and a format descriptor for a processing information response message, further controlling said each agent for when a received message is found to match said processing information acquisition request message format descriptor, generating a plurality of processing information acquisition messages having respective identifiers of said propagation destination agents as the destination identifiers thereof, each having the content portion of said received message as the content portion thereof, and transmitting said messages via said network, when a received message is found to match said processing information acquisition message format descriptor, executing at least one of said second and third pattern matching operations, as predetermined for said processing information acquisition message format descriptor, and when each of said pattern matching operations have been successful, extracting from said script a part of said processing information, as predetermined for said processing information acquisition message format descriptor, generating a processing information response message having said extracted processing information as the content portion thereof and having the sender identifier of said received message as the destination identifier thereof, and transmitting said response message via said network, when a received message is found to match said processing information response message format descriptor, extracting said processing information constituting the content portion of said received message and combining said processing information with existing contents of said script.

16. The method according to claim 14, further comprising controlling said each agent to generate a plurality of processing information acquisition messages having as respective destination identifiers said identifiers of said propagation destination agents, when a propagation message has been originated by said agent, with each of said processing information acquisition messages having the content portion of said propagation message as the content portion thereof, the method further comprising inserting into said message segment of said script a format descriptor for a processing information acquisition request message, format descriptor for a processing information acquisition message, and a format descriptor for a processing information response message, and further controlling said each agent for executing at least one of said second and third pattern matching operations, as predetermined for said processing information acquisition message format descriptor, when a received message is found to match said processing information acquisition message format descriptor, and when each of said pattern matching operations have been successful, extracting a part of said processing information, as predetermined for said processing information acquisition message format descriptor, generating a processing information response message having said extracted processing information as the content portion thereof and having the sender identifier of said received message as the destination identifier thereof, and transmitting said response message via said network, when a received message is found to match said processing information response message format descriptor, extracting said specific processing information from said received message and combining said processing information with existing contents of said script.

17. The method according to claim 14, wherein each of said knowledge provider agents further comprises collected information storage means (807) and information collection message generating means (906) for originating an information collection message to obtain from a predetermined number of said agents respective response information sets relating to a specific message content portion, at times determined by predetermined criteria, said information collection message being formed of said specific content portion, and a count number which differs from a threshold value by said predetermined number, and having the identifier of a predetermined one of said propagation destination agents as the destination identifier thereof, wherein said message segment of said script further includes a format descriptor for an information collection message, and a format descriptor for an information collection response message, and wherein said script execution and message handling means of said each knowledge provider agent further comprise means for, when said received message is found to match said information collection message format descriptor, applying said second and third pattern matching operations to said content portion of said received message, and when matching success is achieved for both of said second and pattern matching operations and a response information set thereby obtained, decrementing said count number by a predetermined amount to obtain an updated count number, and when said updated count number is higher than said threshold value, generating an updated information collection message having as its content portion the content portion of said received message, with said obtained response information set and any previously obtained response information set(s) from said received message appended thereto, having the sender identifier of said received message as the sender identifier thereof, and having the identifier of said predetermined propagation destination agent as the destination identifier thereof, and transmitting said updated information collection message via said network, while when said updated count value is not higher than said threshold value, generating an information collection response message having the sender identifier of the received message as the destination identifier thereof, and having as the content portion thereof said obtained response information set together with any response information sets contained in said received message, and transmitting said information collection response message via said network, while, when matching success is not achieved for both of said second and third pattern matching operations, changing the destination identifier of said received message to that of said predetermined propagation destination agent, and transmitting the resultant message via said network, and when said received message is found to match said information collection response message format descriptor, extracting said response information sets constituting the content portion of said received message, and storing said response information sets in said collected information storage means (807).

\* \* \* \* \*